(12) United States Patent
Kubo et al.

(10) Patent No.: US 11,597,221 B2
(45) Date of Patent: Mar. 7, 2023

(54) LIQUID DISCHARGE APPARATUS

(71) Applicants: Isamu Kubo, Kanagawa (JP); Ryo Honda, Kanagawa (JP)

(72) Inventors: Isamu Kubo, Kanagawa (JP); Ryo Honda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/493,842

(22) Filed: Oct. 5, 2021

(65) Prior Publication Data

US 2022/0105722 A1 Apr. 7, 2022

(30) Foreign Application Priority Data

Oct. 6, 2020 (JP) .............................. JP2020-169112
Sep. 3, 2021 (JP) .............................. JP2021-144130

(51) Int. Cl.
*B41J 25/308* (2006.01)
*B41J 3/407* (2006.01)
*B41J 25/304* (2006.01)

(52) U.S. Cl.
CPC ........... *B41J 25/308* (2013.01); *B41J 3/4073* (2013.01); *B41J 25/304* (2013.01)

(58) Field of Classification Search
CPC .... B41J 25/304; B41J 25/308; B41J 25/3082; B41J 25/3084; B41J 25/3086; B41J 25/3088; B41J 25/316; B41J 29/38; B41J 29/387; B41J 3/407; B41J 3/4073; B41J 3/4078

See application file for complete search history.

(56) References Cited

U.S. PATENT DOCUMENTS

| | | | |
|---|---|---|---|
| 2004/0141784 A1* | 7/2004 | Patton | B41J 3/4073 400/323 |
| 2006/0192798 A1 | 8/2006 | Kuki et al. | |
| 2008/0240825 A1 | 10/2008 | Furuyama | |
| 2021/0078343 A1* | 3/2021 | Alvarez Tapia | B41J 11/0095 |
| 2021/0291514 A1 | 9/2021 | Kitaoka | |

FOREIGN PATENT DOCUMENTS

| | | |
|---|---|---|
| CN | 211363997 U | 8/2020 |
| JP | 2018-001715 | 1/2018 |
| WO | 02/18148 A1 | 3/2002 |
| WO | 2019/143339 A1 | 7/2019 |

OTHER PUBLICATIONS

Partial European Search Report dated Mar. 7, 2022 in European Patent Application No. 21201133.2, 18 pages.
PCT Application No. IB2021/056264 filed Jul. 13, 2021, Satoshi Kitaoke.

* cited by examiner

*Primary Examiner* — Scott A Richmond
(74) *Attorney, Agent, or Firm* — Xsensus LLP

(57) ABSTRACT

A liquid discharge apparatus includes a liquid discharge unit and a contact detection unit. The liquid discharge unit has a liquid discharge port from which a liquid is discharged toward an object. The liquid discharge unit is movable along at least one of a first axis and a second axis intersecting the first axis and movable along a third axis intersecting the first axis and the second axis. The third axis is parallel to a direction in which the liquid is discharged from the liquid discharge port toward the object. The contact detection unit detects contact of the liquid discharge unit with the object. The contact detection unit is detachably attached to the liquid discharge unit.

10 Claims, 28 Drawing Sheets

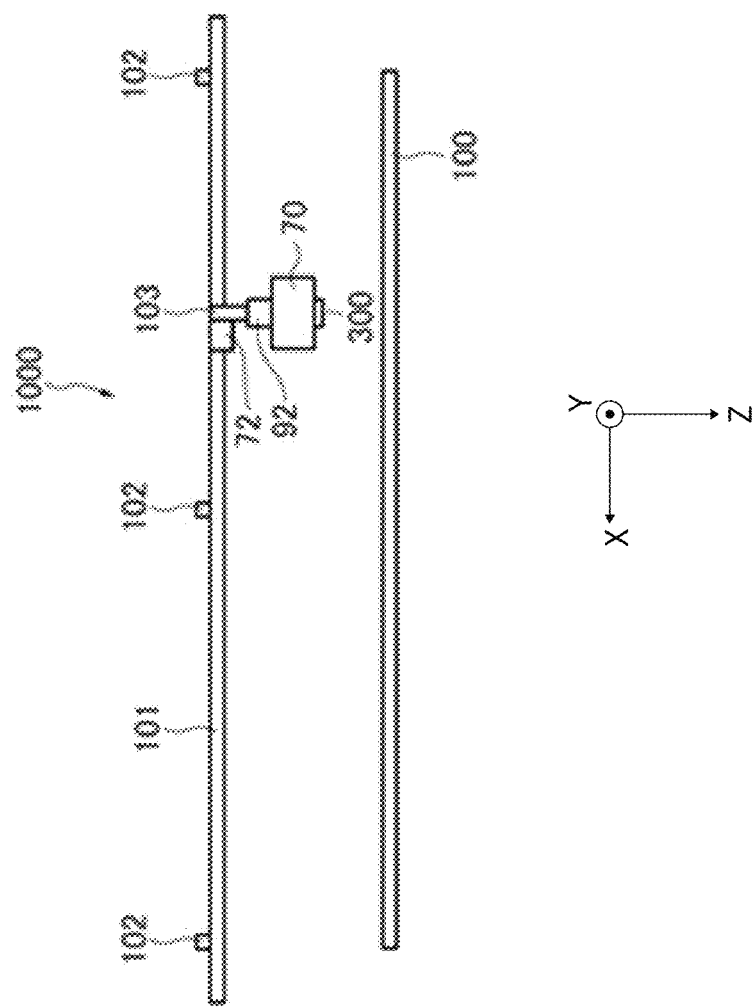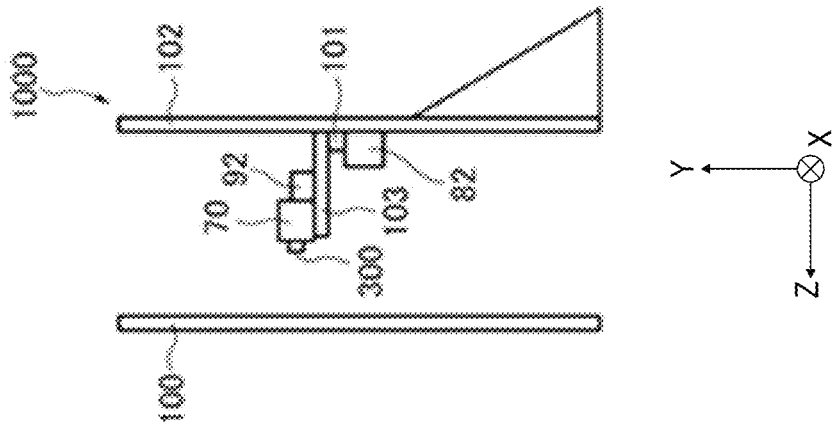

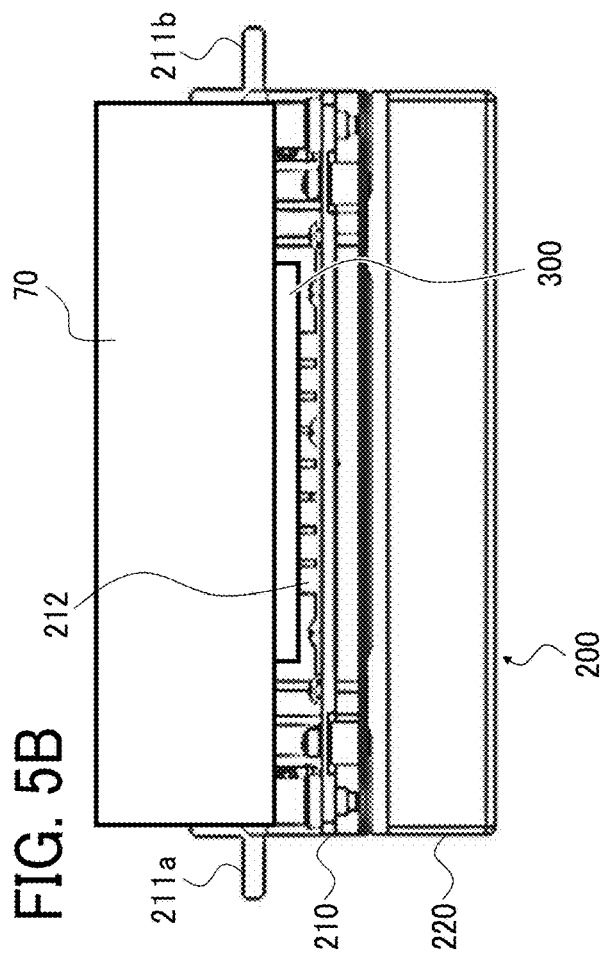
FIG. 5A
FIG. 5B
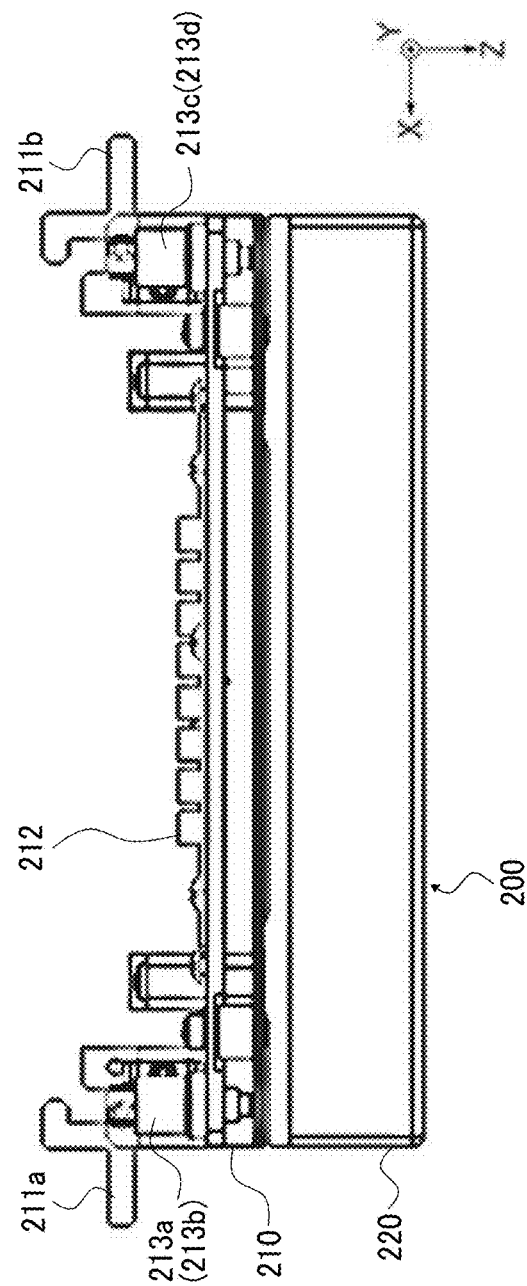
FIG. 6

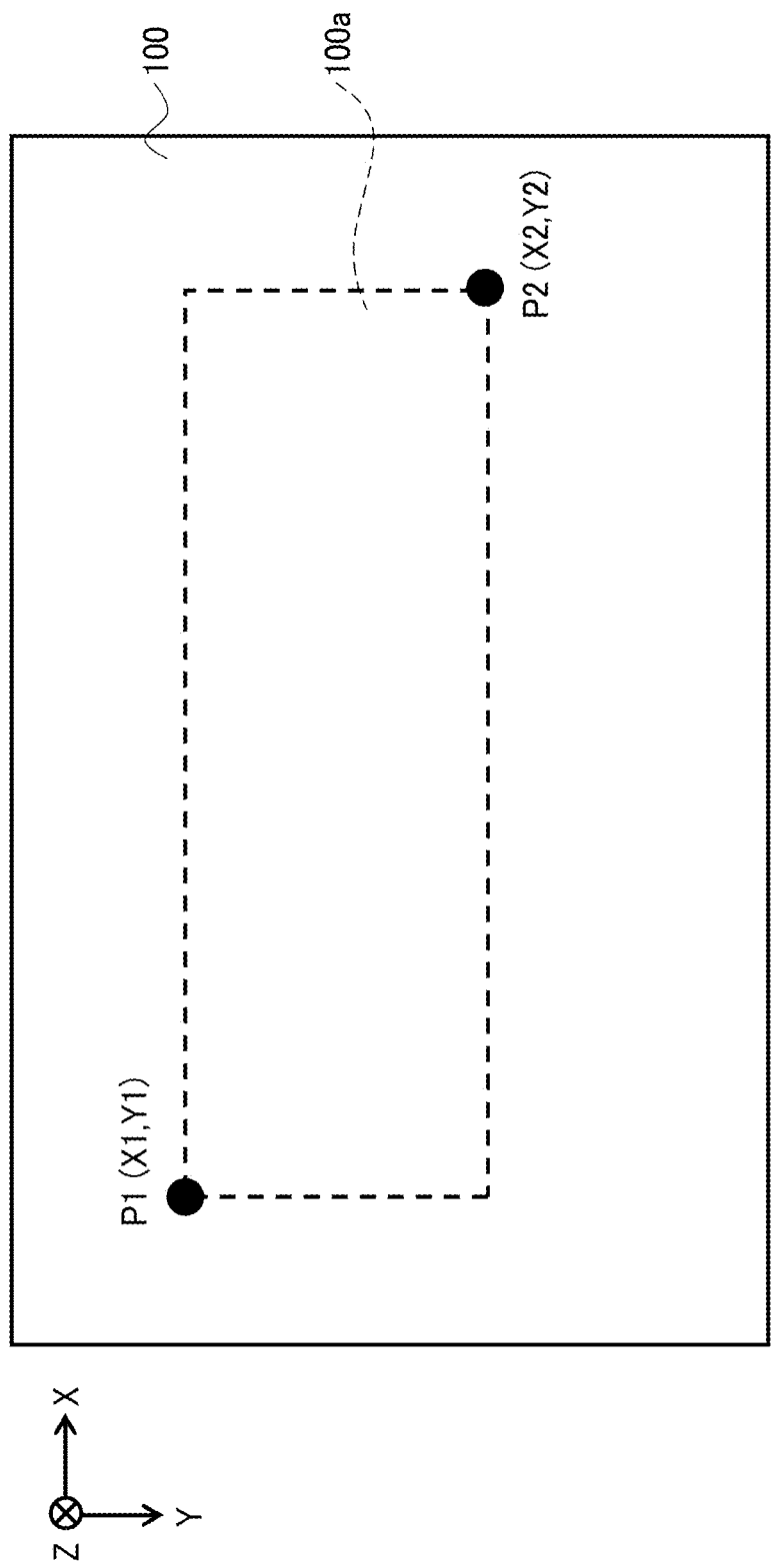

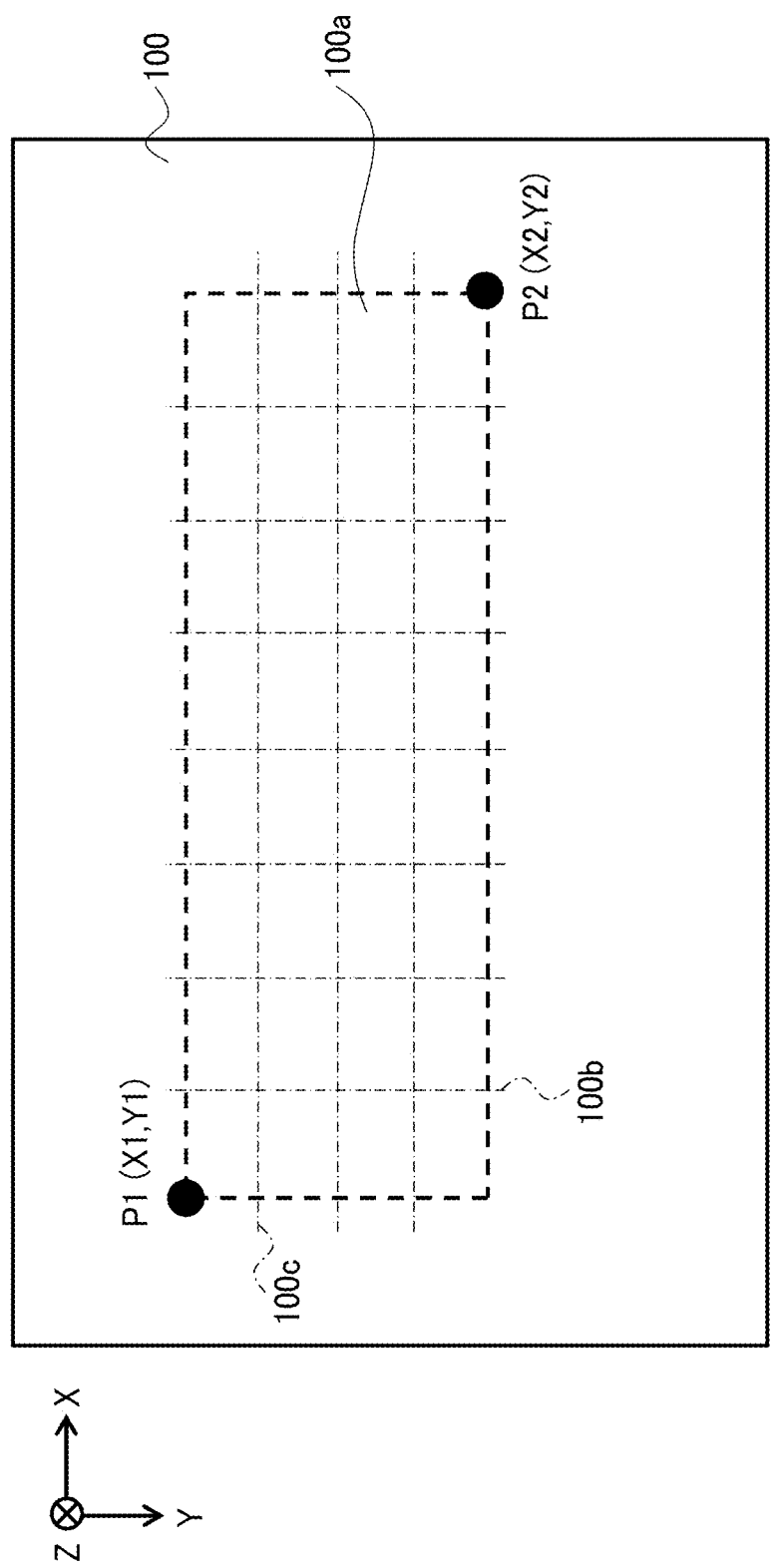

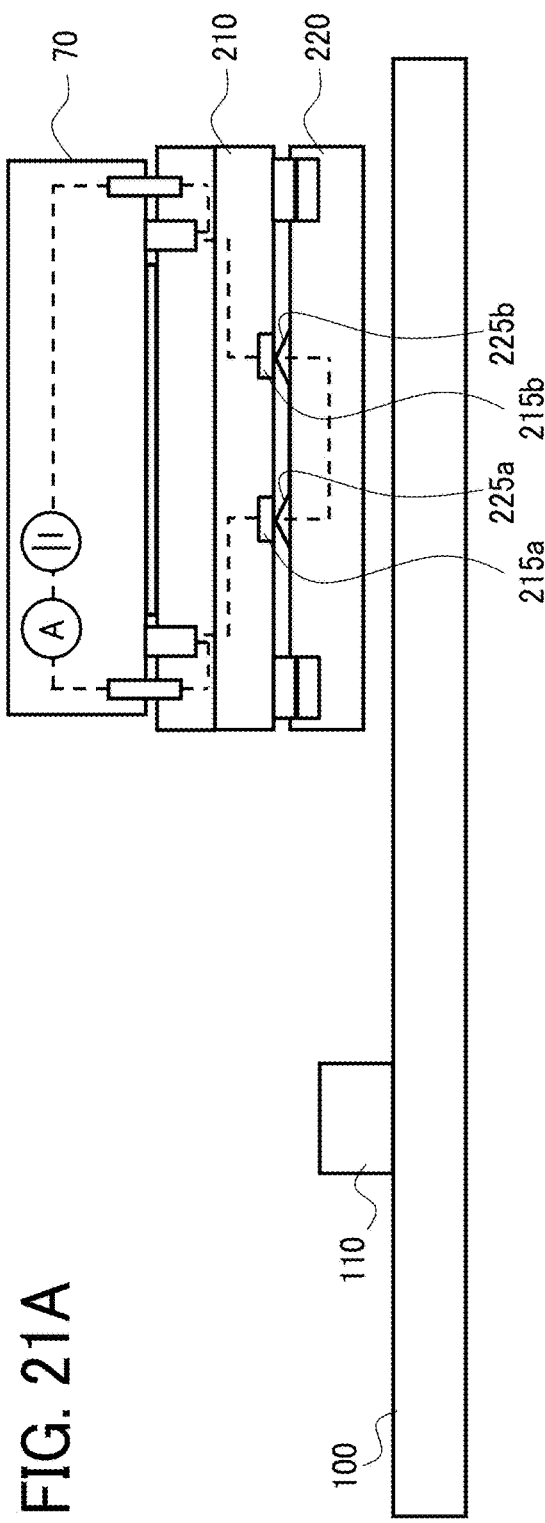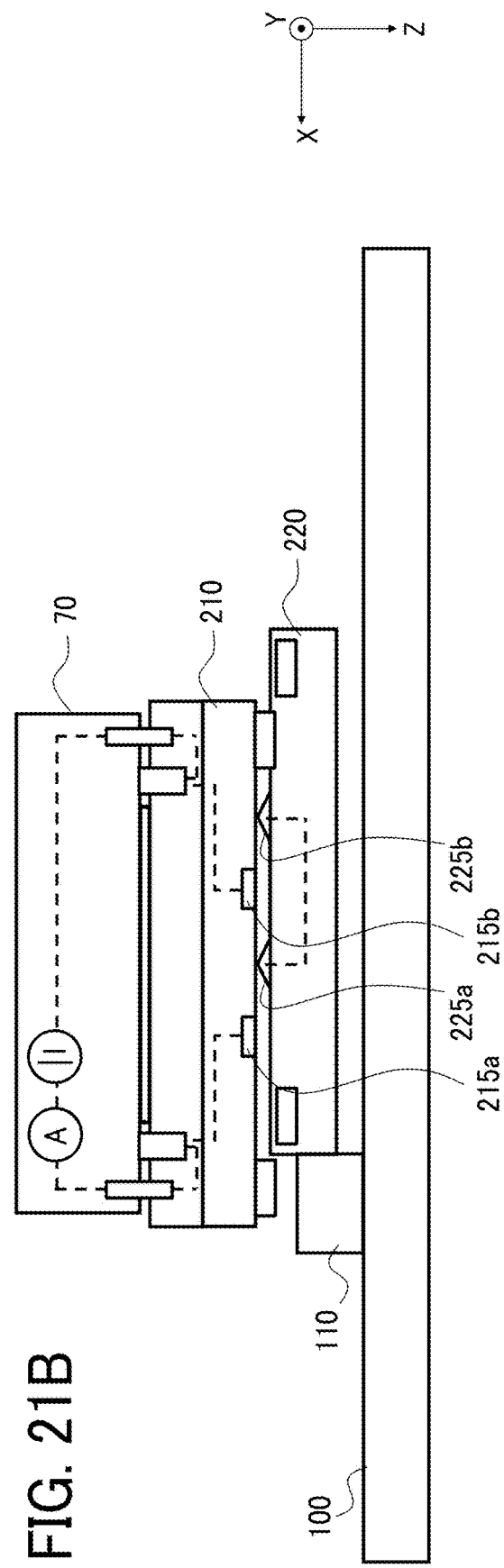

DRAWING AREA

X1 [ 0 ]  BODY DATA [    ]

Y1 [ 0 ]  SET GAP [ 3 ]

X2 [ 0 ]

Y2 [ 0 ]

MOVING SPEED

[ SPEED 1 ▼ ]

[ OK ]

503

LIQUID DISCHARGE APPARATUS

CROSS-REFERENCE TO RELATED APPLICATIONS

This patent application is based on and claims priority pursuant to 35 U.S.C. § 119(a) to Japanese Patent Application Nos. 2020-169112, filed on Oct. 6, 2020 and 2021-144130, filed on Sep. 3, 2021, in the Japan Patent Office, the entire disclosure of each of which is hereby incorporated by reference herein.

BACKGROUND

Technical Field

Aspects of the present disclosure relate to a liquid discharge apparatus.

Description of the Related Art

A liquid discharge apparatus includes a carriage including a recording head that discharges liquid, and a driver that moves the carriage in the main scanning direction.

SUMMARY

Embodiments of the present disclosure describe an improved liquid discharge apparatus that includes a liquid discharge unit and a contact detection unit. The liquid discharge unit has a liquid discharge port from which a liquid is discharged toward an object. The liquid discharge unit is movable along at least one of a first axis and a second axis intersecting the first axis and movable along a third axis intersecting the first axis and the second axis. The third axis is parallel to a direction in which the liquid is discharged from the liquid discharge port toward the object. The contact detection unit detects contact of the liquid discharge unit with the object. The contact detection unit is detachably attached to the liquid discharge unit.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 1A and 1B are schematic views illustrating an overall configuration of a liquid discharge apparatus according to an embodiment of the present disclosure;

FIGS. 5A and 5B are plan views illustrating of a head of the carriage and the surrounding structure;

FIG. 6 is a plan view of the contact detection unit;

FIG. 12 is a schematic diagram illustrating a relation between an object and a drawing area;

FIG. 15 is a schematic diagram illustrating a case in which coordinate data of the object is automatically acquired;

FIGS. 21A and 21B are schematic views illustrating an example in which a protrusion is detected in the verification;

Figure 2:
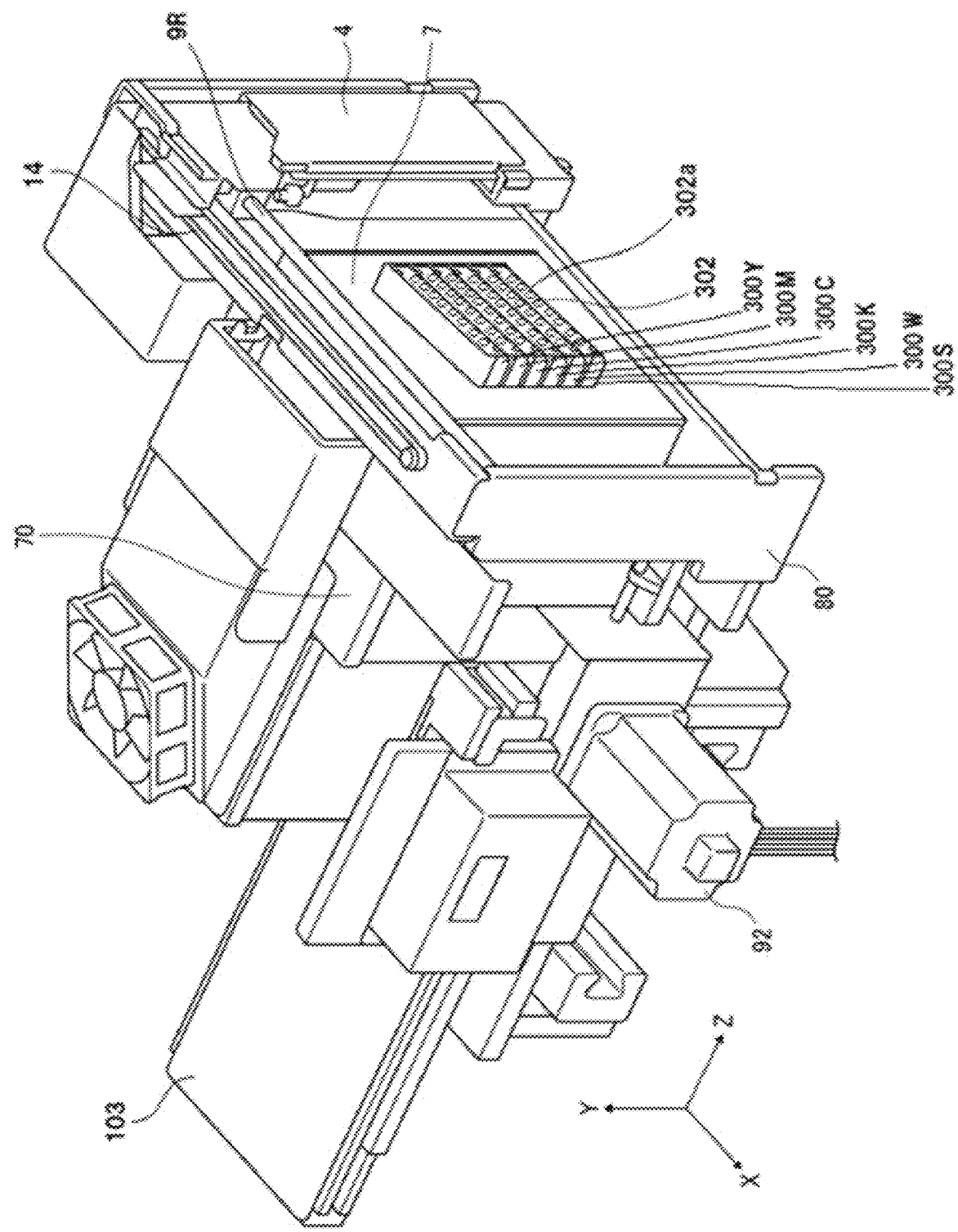
FIG. 2 is a perspective view of a carriage at a standby position on a Z-axis in the liquid discharge apparatus illustrated in FIGS. 1A and 1B.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a," "an," and "the" are intended to include the plural forms as well, unless the context clearly indicates otherwise.

It is to be noted that the suffixes Y, M, C, K, W, and S attached to each reference numeral indicate only that components indicated thereby are used for forming yellow, magenta, cyan, black, white, and spot color images, respectively, and hereinafter may be omitted when color discrimination is not necessary.

Embodiments of the present disclosure are described below with reference to the drawings. FIGS. 1A and 1B are schematic views illustrating an overall configuration of a liquid discharge apparatus 1000 according to an embodiment of the present disclosure. FIG. 1A is a side view, and FIG. 1B is a plan view of the liquid discharge apparatus 1000.

The liquid discharge apparatus 1000 is installed so as to face an object 100 on which images are drawn. The liquid discharge apparatus 1000 includes an X-axis rail 101, a Y-axis rail 102 intersecting the X-axis rail 101, and a Z-axis rail 103 intersecting the X-axis rail 101 and the Y-axis rail 102. The Y-axis rail 102 movably holds the X-axis rail 101 along a Y-axis. The X-axis rail 101 movably holds the Z-axis rail 103 along an X-axis. The Z-axis rail 103 movably holds a carriage 70 along a Z-axis. Here, the X-axis is an example of a first axis. The Y-axis is an example of a second axis intersecting the first axis. The Z-axis is an example of a third axis intersecting the first axis and the second axis. The carriage 70 is an example of a liquid discharge unit, and the carriage 70 includes a head 300 that discharges ink, which is an example of liquid, toward the object 100.

The carriage 70 includes a Z-direction driver 92 that drives the carriage 70 along the Z-axis along the Z-axis rail 103. The Z-axis rail 103 includes an X-direction driver 72 that drives the Z-axis rail 103 along the X-axis along the X-axis rail 101. The X-axis rail 101 includes a Y-direction driver 82 that drives the X-axis rail 101 along the Y-axis along the Y-axis rail 102. The liquid discharge apparatus 1000 described above discharges ink from the head 300 toward the object 100 based on drawing data while moving the carriage 70 along the X-axis, the Y-axis, and the-Z axis, thereby drawing images on the object 100.

The movement of the carriage 70 in the Z-axis direction may not be parallel to the Z-axis, and may be an oblique movement including at least a Z-axis component. Further, the object 100 is not limited to a plane. The object 100 may have a surface which is nearly vertical or a curved surface with the large radius of curvature, such as a body of a car, a truck, or an aircraft.

Next, the configuration of the carriage 70 is described. FIG. 2 is a perspective view of the carriage 70 at a standby position on the Z-axis. The carriage 70 is movable along the Z-axis along the Z-axis rail 103 by driving force of the Z-direction driver 92. The carriage 70 includes a head fixing plate 7 for attaching the head 300. In FIG. 2, a head 300Y for yellow, a head 300M for magenta, a head 300C for cyan, a head 300K for black, a head 300W for white, and a head 300S for spot color are attached to the head fixing plate 7. Hereinafter, these heads are collectively referred to as heads 300.

Each of the heads 300 includes a liquid discharge face (nozzle face) 302a having a plurality of nozzles 302. The nozzle 302 is an example of a "liquid discharge port." Note that the types and number of colors of the inks used in the heads 300 are not limited to the above-described example. For example, all inks used in the heads 300 may be the same color. The head 300 is secured to the head fixing plate 7 such that the liquid discharge face (nozzle face) 302a intersects the horizontal plane (i.e., X-Z plane) and the plurality of nozzles 302 is obliquely arrayed with respect to the X-axis. Thus, the head 300 discharges ink from the nozzle 302 in a direction (Z-axis direction in the present embodiment) intersecting the direction of gravity.

As illustrated in FIG. 2, a cleaning unit 4 is provided to clean the heads 300. The cleaning unit 4 moves parallel to the X-axis along a guide rail 9R secured to a frame 80. A motor that moves the cleaning unit 4 along the guide rail 9R, a position sensor that detects the position of the cleaning unit 4, for example, at a standby position and a return position, on the X-axis are disposed in the frame 80. With the above configuration, the motor transmits driving force to a belt 14 illustrated in FIG. 2 to move the cleaning unit 4 coupled to the belt 14 in the positive X-axis direction along the guide rail 9R. Then, the cleaning unit 4 cleans the liquid discharge face (nozzle face) 302a and the nozzles 302. When the cleaning unit 4 further moves in the positive X-axis direction and reaches the return position, the cleaning unit 4 switches the moving direction to the negative X-axis direction and returns to the standby position.

Figure 3:
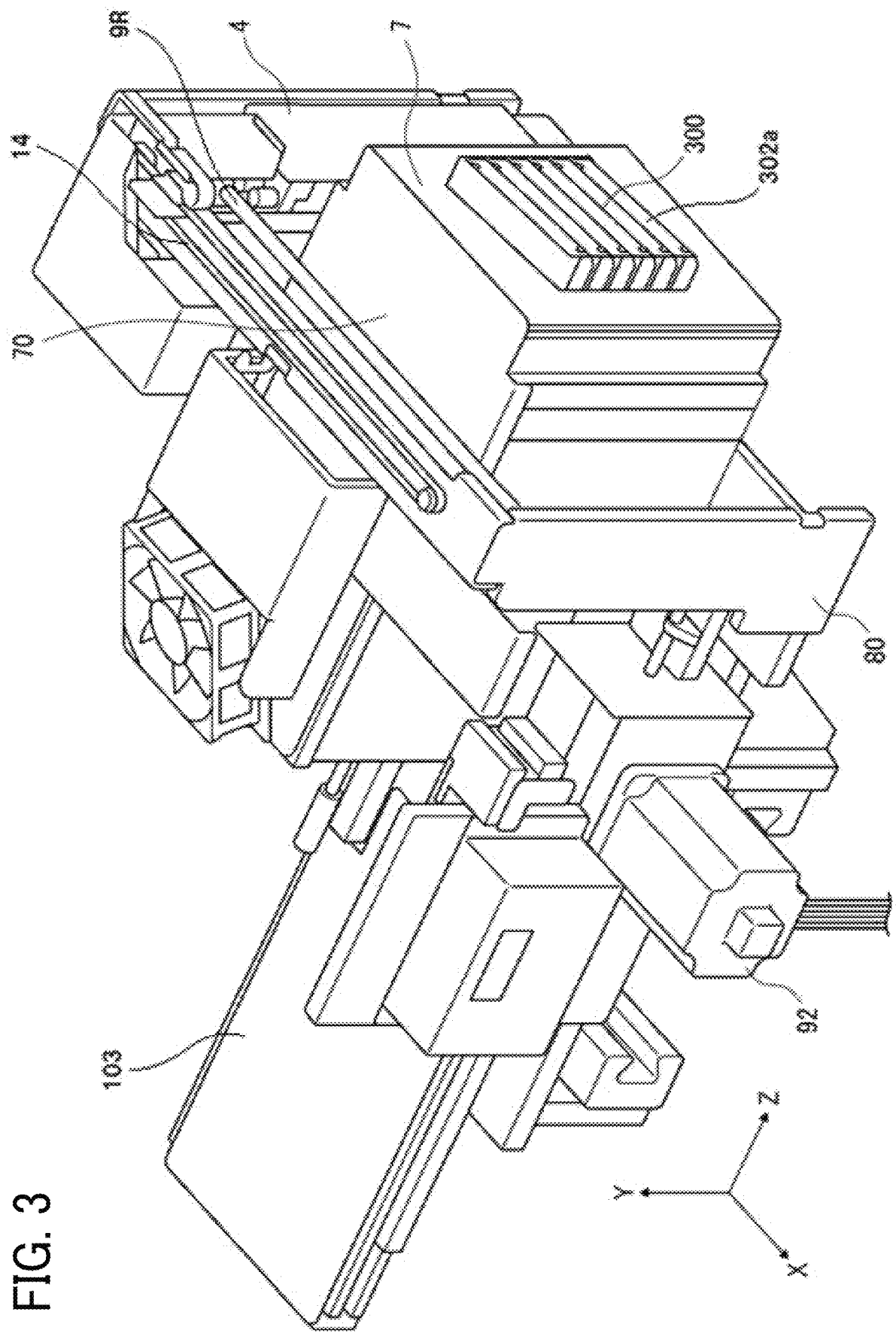
FIG. 3 is a perspective view of the carriage at an ink discharge position on the Z-axis.

FIG. 3 is a perspective view of the carriage 70 at an ink discharge position on the Z-axis. In FIG. 3, the carriage 70 has moved in the positive Z-axis direction toward the object 100, unlike the state illustrated in FIG. 2. The carriage 70 moves along the Z-axis between the ink discharge position illustrated in FIG. 3 at which ink is discharged toward the object 100 and the standby position illustrated in FIG. 2 at which the head 300 is away from the object 100 as compared with the ink discharge position. The ink discharge position of the carriage 70 is not fixed, but is variable based on drawing data.

Figure 4:
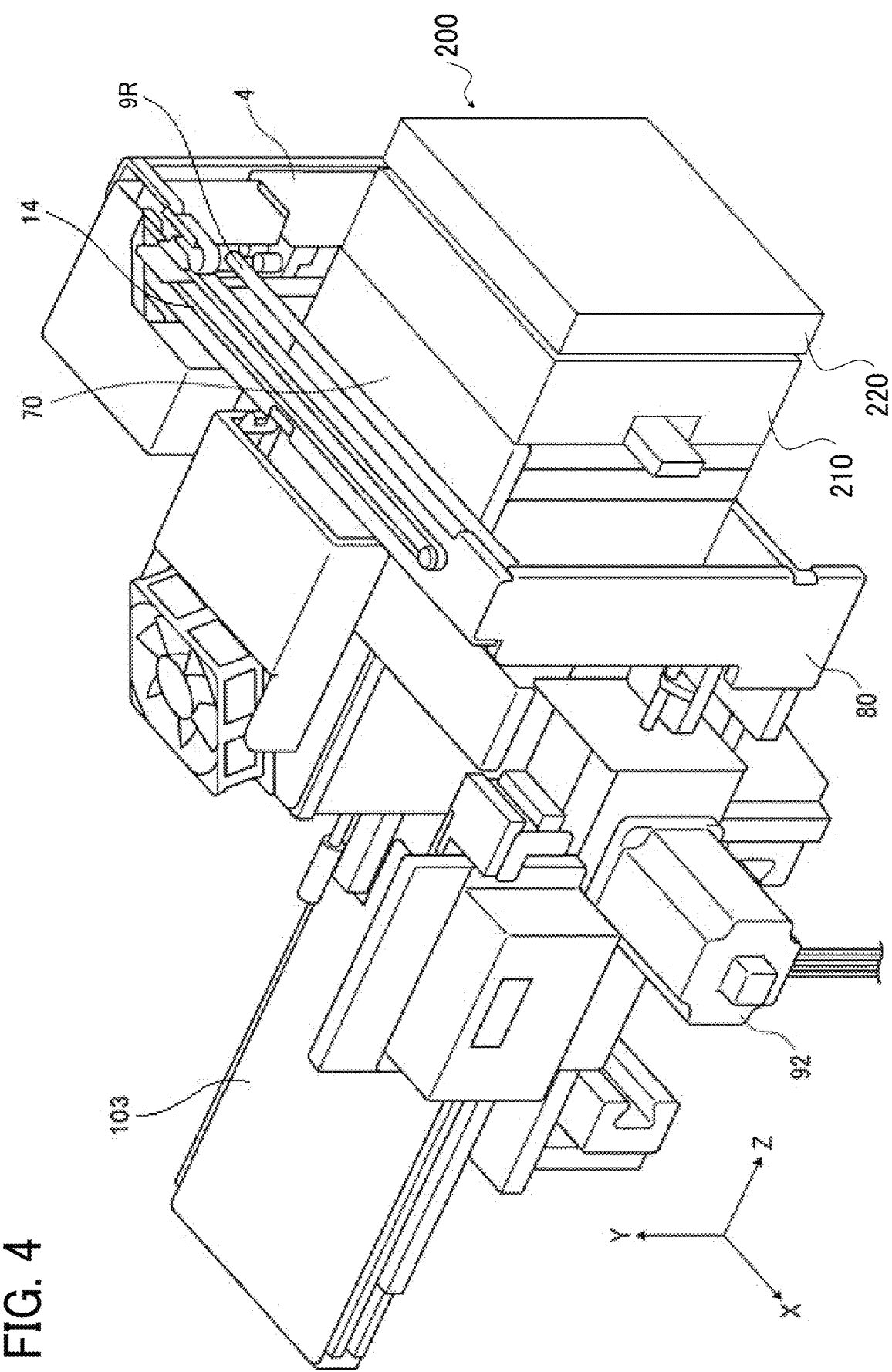
FIG. 4 is a perspective view of the carriage to which a contact detection unit is attached.

FIG. 4 is a perspective view of the carriage 70 to which a contact detection unit 200 is attached. The contact detection unit 200 includes a first detector 210 and a second detector 220. The first detector 210 is detachably attached to the carriage 70, and the second detector 220 is detachably attached to the first detector 210. Here, the first detector 210 is an example of a first component, and the second detector 220 is an example of a second component. Hereinafter, the configuration of the contact detection unit 200 is described in detail.

FIGS. 5A and 5B are plan views illustrating the heads 300 of the carriage 70 and the surrounding structure. FIG. 5A illustrates a state in which the contact detection unit 200 is not attached, and FIG. 5B illustrates a state in which the contact detection unit 200 is attached to the carriage 70. The contact detection unit 200 includes the first detector 210 that is detachably attached to the carriage 70 and the second detector 220 that is detachably attached to the first detector 210. The first detector 210 includes locks 211a and 211b, and the locks 211a and 211b are detachably attached to attachment portions of the carriage 70. Thus, the contact detection unit 200 is detachably attached to the carriage 70. The first detector 210 further includes head protectors 212 at the position facing the heads 300. Each head protector 212 faces the corresponding nozzle 302 of the heads 300. The head protector 212 covers each nozzle 302 when the contact detection unit 200 is attached to the carriage 70, and prevents the nozzles 302 from being dried and foreign substances from adhering to the nozzles 302.

FIG. 6 is a plan view of the contact detection unit 200. In FIG. 6, elements identical to those illustrated in FIGS. 5A and 5B are given identical reference numerals, and the descriptions thereof are omitted. The first detector 210 includes push switches 213a, 213b, 213c, and 213d. Hereinafter, these push switches 213a, 213b, 213c, and 213d are collectively referred to as push switches 213, and each of the push switches 213a, 213b, 213c, and 213d is simply referred to as a push switch 213 unless distinguished. The push switch 213 operates in response to the movement of the second detector 220 attached to the first detector 210. The push switch 213 is operated by a pressing force received from the second detector 220 when the second detector 220 moves in the negative Z-axis direction during a position measurement of the surface of the object 100. A detailed description of the position measurement is deferred. Here, the push switch 213 is an example of a position detector.

Figure 7:
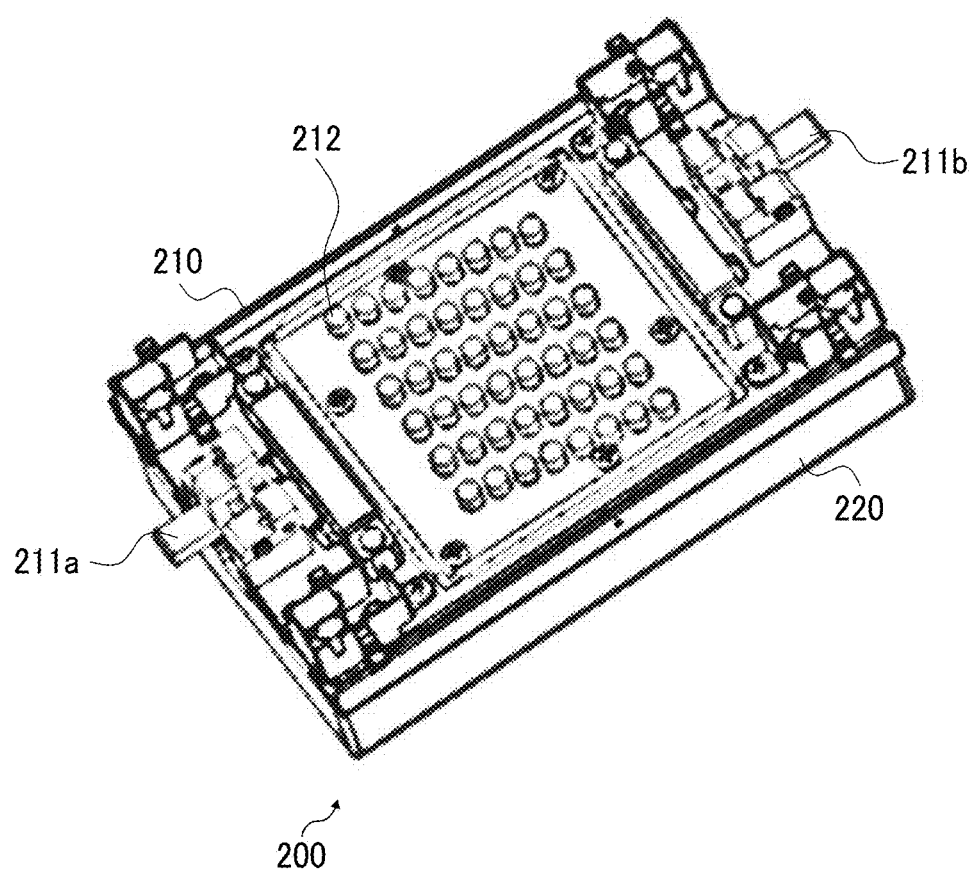
FIG. 7 is a rear perspective view of the contact detection unit.

FIG. 7 is a rear perspective view of the contact detection unit 200. In FIG. 7, elements identical to those illustrated in FIGS. 5A, 5B, and 6 are given identical reference numerals, and the descriptions thereof are omitted. As illustrated in the drawings, each of the head protectors 212 provided on the first detector 210 faces the position of each nozzle 302 of the head 300. The head protectors 212 are made of an elastic body such as sponge or rubber. FIG. 7 illustrates a configuration in which 48 head protectors 212 corresponding to 48 (8×6) nozzles 302 are provided. When the contact detection unit 200 is attached to the carriage 70, the head protector 212 covers each nozzle 302 of the head 300 to prevent the nozzles 302 from being dried and foreign substances from adhering to the nozzles 302. The number and arrangement of the nozzles 302 are not limited to the above-described example. The nozzles may be arranged in a row in the vertical or horizontal direction instead of the two dimensional arrangement in the vertical and horizontal directions as illustrated. Further, the number of nozzles may be one instead of two or more.

Figure 8A:
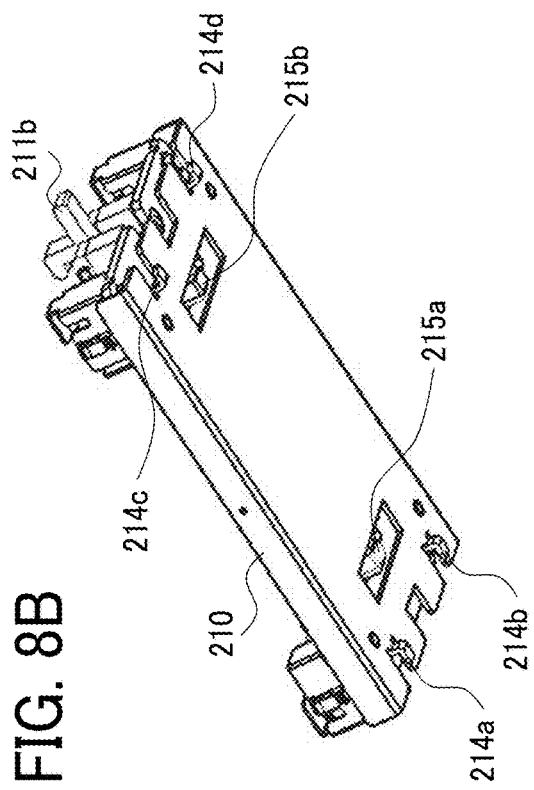
FIGS. 8A to 8D are schematic views of a first detector and a second detector of the contact detection unit.
Figure 8C:
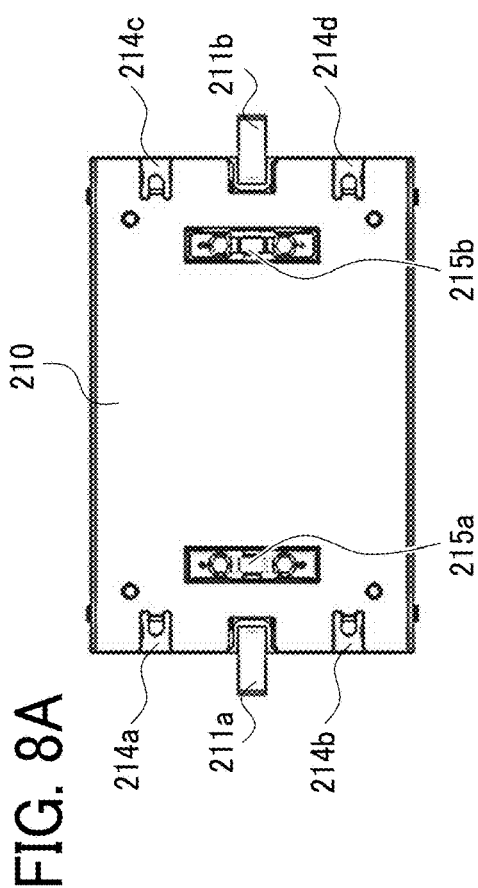
Figure 8B:
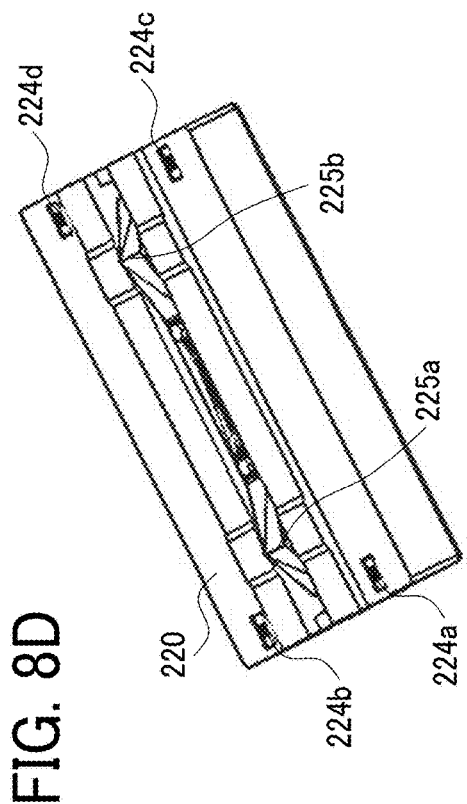
Figure 8D:
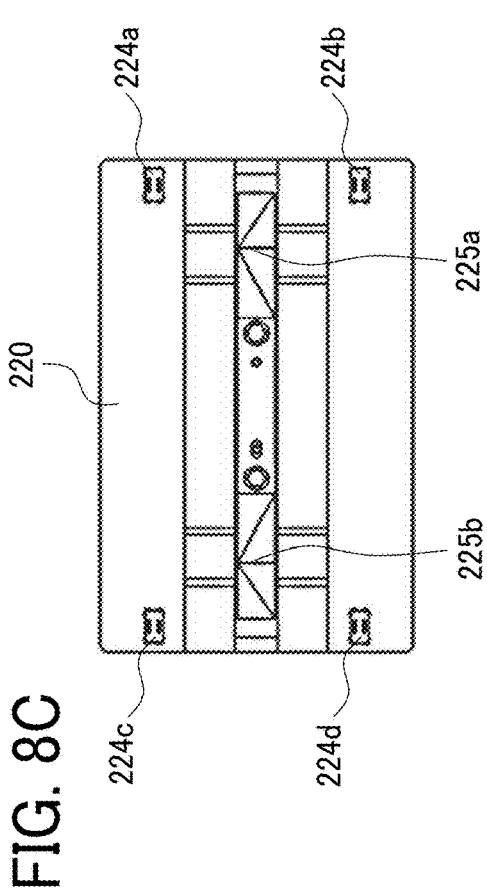

FIGS. 8A to 8D are schematic views of the first detector 210 and the second detector 220 of the contact detection unit 200. FIGS. 8A and 8B illustrate the first detector 210. FIG. 8A is a front view of the first detector 210, and FIG. 8B is a perspective view of the first detector 210 as viewed from the front side. FIGS. 8C and 8D illustrate the second detector 220. FIG. 8C is a rear view of the second detector 220, and FIG. 8D is a perspective view of the second detector 220 as viewed from the rear side.

As illustrated in FIGS. 8A and 8B, the first detector 210 includes magnets 214a, 214b, 214c, and 214d as an example of a component that generates magnetic force on the front surface. The first detector 210 further includes detection plates 215a and 215b on the front surface. Further, the first detector 210 includes the locks 211a and 211b that are used when the first detector 210 is attached to the carriage 70. Hereinafter, these magnets 214a, 214b, 214c, and 214d are collectively referred to as magnets 214. On the other hand, as illustrated in FIGS. 8C and 8D, the second detector 220 includes magnets 224a, 224b, 224c, and 224d as an example of a component that generates magnetic force on the back surface. Further, the second detector 220 includes conductive flat springs 225a and 225b on the back surface. Hereinafter, these magnets 224a, 224b, 224c, and 224d are collectively referred to as magnets 224.

The first detector 210 and the second detector 220 are attached to each other such that the front surface of the first detector 210 and the back surface of the second detector 220 face each other. The second detector 220 is attached to the first detector 210 by the magnetic force of the magnets 214 and the magnets 224. The surface of the magnets 214 of the first detector 210 slightly projects from the surrounding surface (surface on which the magnets 214 are not disposed). On the other hand, the surface of the magnets 224 of the second detector 220 is slightly recessed from the surrounding surface (surface on which the magnets 224 are not disposed). Thus, the magnets 214 and the magnets 224 form projections and recesses, respectively. Accordingly, when the second detector 220 is attached to the first detector 210, the relative position between the first detector 210 and the second detector 220 is secured at one place, which facilitates positioning. When the second detector 220 is attached to the first detector 210, the flat spring 225a of the second detector 220 contacts the detection plate 215a of the first detector 210, and the flat spring 225b of the second detector 220 contacts the detection plate 215b of the first detector 210.

Figure 9:
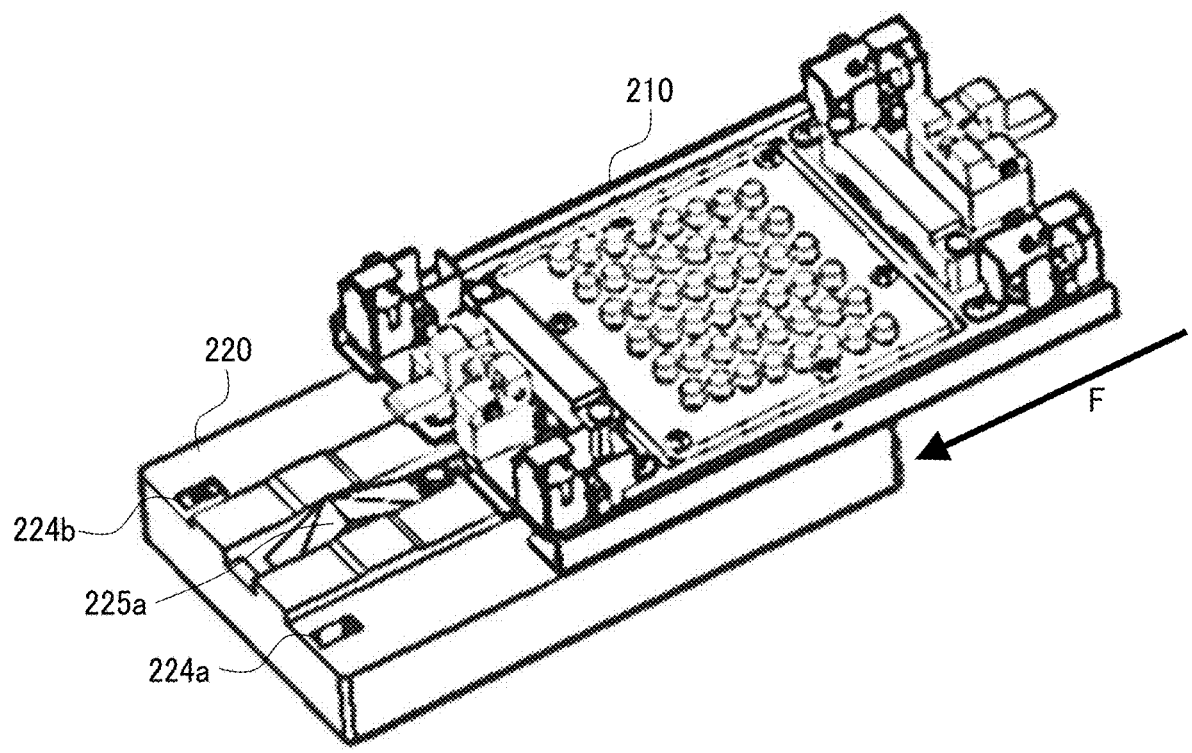
FIG. 9 is a perspective view of the first detector and the second detector.

FIG. 9 is a perspective view of the first detector 210 and the second detector 220. As described above, the first detector 210 and the second detector 220 are attached to each other by the magnetic force of the magnets 214 of the first detector 210 and the magnets 224 of the second detector 220. As illustrated in FIG. 9, the magnetic force is set to an intensity that allows a relative movement between the first detector 210 and the second detector 220 when an external force is applied to the side surface of the second detector 220, for example, in the direction indicated by arrow F. The above-described relative movement is utilized when the second detector 220 detects a collision object such as a protrusion on the surface of the object 100 in a verification of position data of the object 100, which is described later. As the second detector 220 moves relative to the first detector 210, the flat springs 225a and 225b of the second detector 220 separate from the detection plates 215a and 215b of the first detector 210, and the contact detection unit 200 outputs an electric signal. Here, the detection plates 215a and 215b are an example of a collision object detector.

Figure 10B:
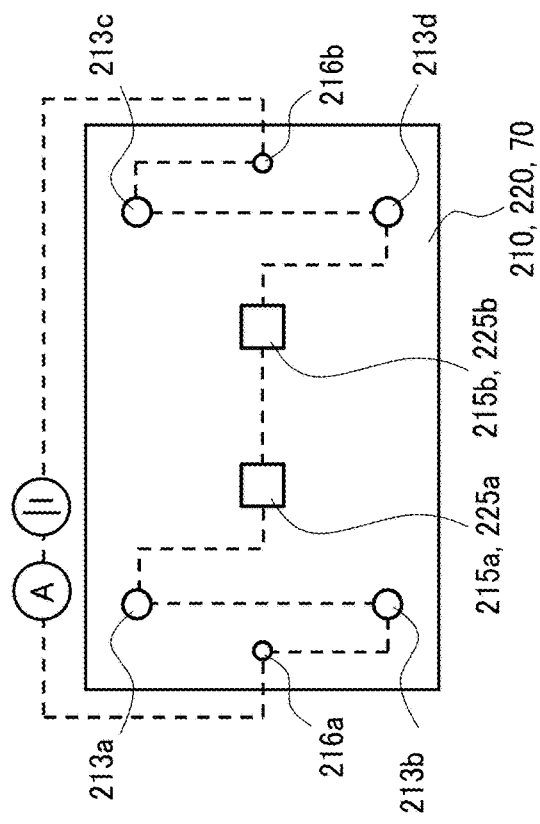
FIGS. 10A and 10B are schematic views illustrating an electrical connection of the contact detection unit.
Figure 10A:
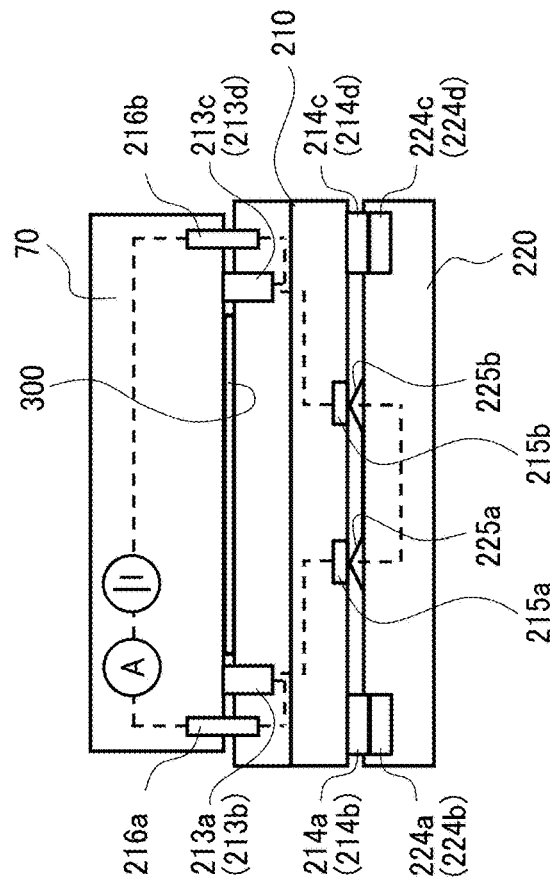

FIGS. 10A and 10B are schematic views illustrating an electrical connection of the contact detection unit 200. FIG. 10A is a schematic plan view illustrating the electrical connection of the contact detection unit 200, and FIG. 10B is a schematic front view illustrating the electrical connection of the contact detection unit 200. The first detector 210 is attached to the carriage 70 including the head 300 with the locks 211a and 211b (see FIG. 6). When the first detector 210 is attached to the carriage 70, pin-shaped connection terminals 216a and 216b provided on the first detector 210 are fitted into jacks provided on the carriage 70, thereby electrically connecting the first detector 210 and the carriage 70. The second detector 220 is attached to the first detector 210 by the magnetic force of the magnets 214 and magnets 224. When the second detector 220 is attached to the first detector 210, the detection plates 215a and 215b of the first detector 210 and the flat springs 225a and 225b of the second detector 220 are in contact with each other, and the first detector 210 and the second detector 220 are electrically connected to each other.

The detection plate 215a of the first detector 210 is electrically connected to the connection terminal 216a via the push switch 213a and the push switch 213b. The other detection plate 215b is electrically connected to the connection terminal 216b via the push switch 213c and the push switch 213d. As described above, the push switches 213 and the detection plates 215a and 215b provided in the first detector 210 and the flat springs 225a and 225b provided in the second detector 220 are connected in series to form a series connection circuit. The series connection circuit is electrically conductive when the first detector 210 and the second detector 220 are attached to the carriage 70 at correct positions. For example, the push switch 213 is turned on (conductive state) when not pressed and turned off (non-conductive state) when pressed. When the push switch 213 is in the conductive state, the contact detection unit 200 detects that the first detector 210 and the second detector 220 are at correct positions, and when the push switch 213 is in the non-conductive state, the contact detection unit 200 detects that the first detector 210 or the second detector 220 is not at a correct position.

The configuration of the detector is not limited to the above-described embodiment. A non-contact type detector such as an optical sensor may be used instead of the contact type detector such as the push switches 213 or the detection plates 215a and 215b. The number and arrangement of the detectors are not limited to the above-described embodiment. An appropriate number and arrangement may be adopted in accordance with the size and the like of the carriage 70 and the head 300.

As described above, the liquid discharge apparatus 1000 according to the present embodiment includes the carriage 70 and the contact detection unit 200. The carriage 70 has the nozzle 302 from which ink is discharged toward the object 100. The carriage 70 is movable along at least one of the X-axis and the Y-axis intersecting the X-axis, and movable along the Z-axis intersecting the X-axis and the Y-axis. The Z-axis is parallel to the direction in which the ink is discharged from the nozzle 302 toward the object 100. The contact detection unit 200 detects contact of the carriage 70 with the object 100. The contact detection unit 200 is detachably attached to the carriage 70. Accordingly, the carriage 70 can be prevented from being damaged while moving relative to the object 100.

Here, when the object 100 is a hard metal such as a body of a car, a truck, or an aircraft, an unexpected collision with the object 100 may damage the carriage 70. Therefore, it is necessary to prevent the collision. To reliably prevent such a collision, the carriage 70 includes a detection mechanism to detect the surface shape of the object 100 (e.g., presence or absence of a collision object or the like) on the downstream side in a movement direction of the carriage 70. The detection mechanism may cause the carriage 70 to upsize, resulting in the liquid discharge apparatus 1000 upsizing. In the present embodiment, the contact detection unit 200 as the detection mechanism is detachably attached to the carriage 70, thereby preventing the carriage 70 from upsizing.

As described above, the contact detection unit 200 includes the push switches 213 that detect the position of the object 100 relative to the carriage 70 (i.e., position detection). The contact detection unit 200 further includes the detection plates 215a and 215b that detect a collision object on the object 100 with which the carriage 70 may collide (i.e., collision object detection). Such a simple configuration can implement the position detection and the collision object detection. In addition, the contact detection unit 200 includes the first detector 210 detachably attached to the carriage 70 and the second detector 220 detachably attached to the first detector 210, and implements at least one of the position detection and the collision object detection in response to the movement of the first detector 210 and the second detector 220. Further, the second detector 220 is movable parallel to the movement direction of the carriage 70 relative to the first detector 210. Thus, the single contact detection unit 200 can implement different types of detection (i.e., the position detection and the collision object detection). That is, the contact detection unit 200 detects contact of the carriage 70 with the object 100 in the position detection and the collision object detection.

As described above, the first detector 210 and the second detector 220 are attached to each other by the magnets 214 and 224. Thus, the second detector 220 can be easily positioned relative to the first detector 210.

As described above, the push switch 213 operates (i.e., turns on and off to detect the position of the object 100) as the second detector 220 moves relative to the first detector 210 along the Z-axis, and the detection plates 215a and 215b operate (i.e. separate from the flat springs 225a and 225b to detect a collision object on the object 100) as the second detector 220 moves relative to the first detector 210 along at least one of the X-axis and the Y-axis. The push switches 213 and the flat springs 225a and 225b forms the series connection circuit. When the second detector 220 does not move along any of the X-axis, the Y-axis, and the Z-axis, the contact detection unit 200 outputs a signal indicating that the series connection circuit is in an electrically conductive state. Thus, the liquid discharge apparatus 1000 can detect the attachment state of the first detector 210 and the second detector 220 to the carriage 70.

Figure 11:
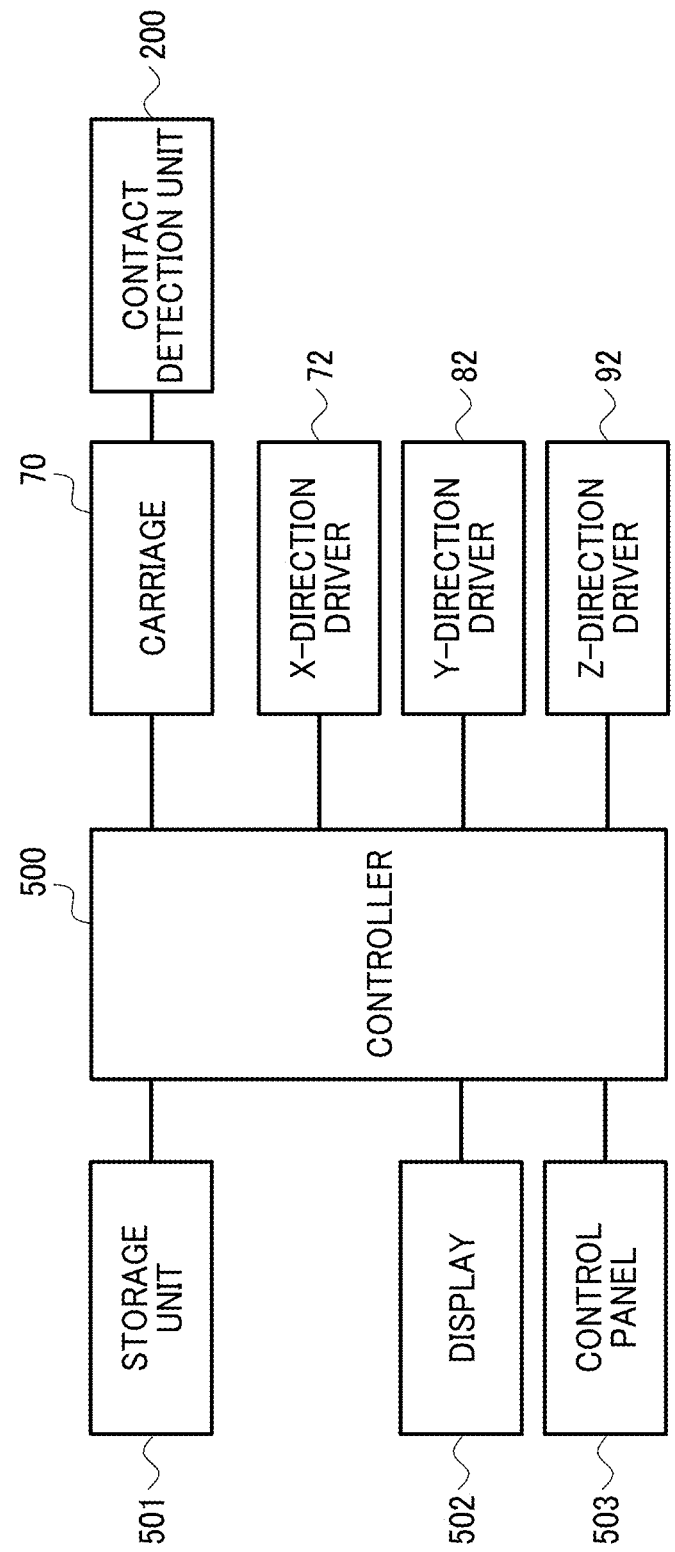
FIG. 11 is a block diagram of a portion of the liquid discharge apparatus related to movement control of the carriage.

FIG. 11 is a block diagram of a portion of the liquid discharge apparatus 1000 related to movement control of the carriage 70. The liquid discharge apparatus 1000 includes the carriage 70, the X-direction driver 72, the Y-direction driver 82, the Z-direction driver 92, the contact detection unit 200, a controller 500, a storage unit 501, a display 502, and a control panel 503. The carriage 70 is movable relative to the object 100 along the X-axis, Y-axis, and Z-axis. The carriage 70 includes the head 300 (see FIG. 1) that discharges ink toward the object 100. The X-direction driver 72 drives the carriage 70 along the X-axis based on an instruction from the controller 500. The Y-direction driver 82 drives the carriage 70 along the Y-axis based on an instruction from the controller 500. The Z-direction driver 92 drives the carriage 70 along the Z-axis based on an instruction from the controller 500.

The contact detection unit 200 is detachably attachable to the carriage 70. Before the carriage 70 discharges ink to the object 100 (i.e., ink discharge), the position of the object 100 may be measured (i.e., position measurement), and position data acquired in the position measurement may be verified (i.e., verification of the position data). The contact detection unit 200 is attached to the carriage 70 in the position measurement and in the verification of the position data. When the contact detection unit 200 is attached to the carriage 70, the above-described series connection circuit is formed, and the signal output from the contact detection unit 200 is transmitted to the controller 500 via the carriage 70.

The controller 500 includes a central processing unit (CPU) and a read-only memory (ROM). The CPU controls the entire liquid discharge apparatus 1000. The ROM stores programs, which include a program to cause the CPU to perform the control of a drawing operation, for example, and other fixed data. The controller 500 further includes a random access memory (RAM) and an interface (I/F). The RAM temporarily stores drawing data and the like. The I/F is used when the controller 500 receives drawing data and the like from a host such as a personal computer (PC) to transmits data and signals. The controller 500 is an example of a control unit.

The controller 500 stores and reads the detection result of the contact detection unit 200 in and from the storage unit 501. The controller 500 causes the X-direction driver 72, the Y-direction driver 82, and the Z-direction driver 92 to move the carriage 70 along the X-axis, the Y-axis, and the Z-axis. The controller 500 controls the ink discharge from the head 300 mounted on the carriage 70. Further, when an abnormality occurs in the operations of the carriage 70 and the head 300, the controller 500 displays information indicating the abnormality to a user on the display 502. The controller 500 receives an instruction from the control panel 503 and executes a process corresponding to the instruction.

The storage unit 501 stores the position data (three dimensional coordinate data) in the position measurement, data in the verification of the position data, and the like from the contact detection unit 200. When an abnormality occurs in the liquid discharge apparatus 1000, the display 502 displays the information indicating the abnormality to the user. The control panel 503 is used to input a value (coordinates) for specifying a drawing area 100*a* (see FIG. 12) where ink is discharged onto the object 100, a moving speed of the carriage 70, a distance between the head 300 and the object 100, and the like. Further, the three dimensional coordinate data indicating the surface shape of the object 100 can be designated on the control panel 503. Note that the display 502 and the control panel 503 may be combined into one screen with a touch panel or the like.

Next, the position measurement by the contact detection unit 200 is described. FIG. 12 is a schematic diagram illustrating a relation between the object 100 and the drawing area 100*a*. The object 100 has various sizes and shapes, and the positional relation between the liquid discharge apparatus 1000 and the object 100 changes depending on the installation state. Therefore, prior to the ink discharge to the object 100, the liquid discharge apparatus 1000 acquires the position data of the surface of the object 100.

For example, in the case of a rectangular drawing area 100*a* as illustrated in FIG. 12, coordinate data of a drawing start position P1 and a drawing end position P2 is stored in the storage unit 501 of the liquid discharge apparatus 1000. Thus, the drawing area 100*a* is determined. In the example illustrated in FIG. 12, the coordinate data indicates X and Y coordinates, but is not limited thereto. Depending on the installation state of the liquid discharge apparatus 1000 and the object 100, the liquid discharge apparatus 1000 may be inclined with respect to the object 100, or a collision object such as a protrusion may be present on the surface of the object 100. Therefore, the coordinate data preferably includes three dimensional coordinates including the Z-direction component.

The drawing area 100*a* is a range in which the carriage 70 of the liquid discharge apparatus 1000 moves. Although the drawing area 100*a* is the range in which the carriage 70 moves, an image is not necessarily drawn on the entire surface of the drawing area 100*a*. Multiple drawing areas, in which the carriage 70 can move, may be present in the same object 100. When a collision object such as a protrusion is present in the drawing area 100*a*, position data of the collision object is stored in the storage unit 501. As an example of the collision object, when the object 100 is a body of a truck, a reinforcing rib of the body corresponds to the collision object.

Figure 13A:
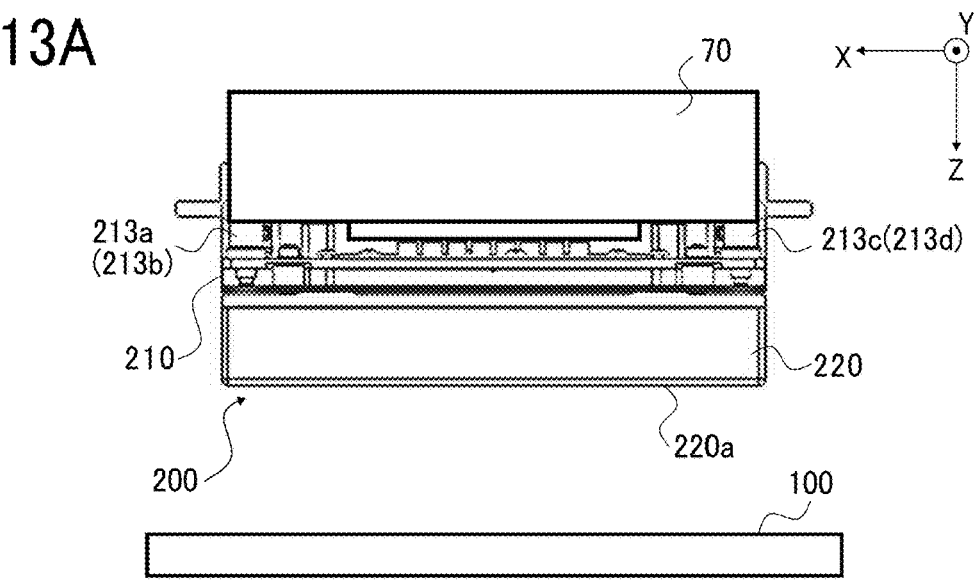
FIGS. 13A and 13B are schematic views for explaining a position measurement according to an embodiment of the present disclosure.
Figure 13B:
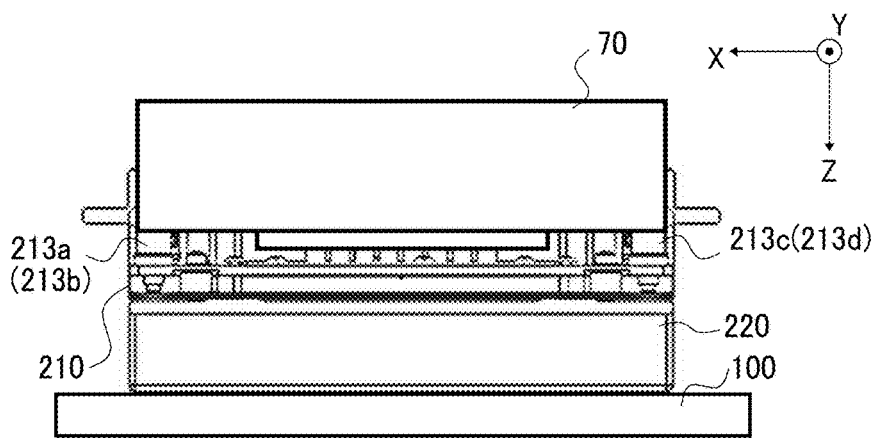

Next, the operation of the position measurement of the drawing area 100*a* of the object 100 by the contact detection unit 200 is described. FIGS. 13A and 13B are schematic views for explaining the position measurement. FIG. 13A is a plan view illustrating a state in which the contact detection unit 200 is separated from the object 100, and FIG. 13B is a plan view illustrating a state in which the contact detection unit 200 contacts the object 100. Prior to the ink discharge to the object 100, the liquid discharge apparatus 1000 performs the position measurement to acquire position data of the drawing area 100*a* of the object 100 and grasp the surface shape of the drawing area 100*a*.

In the position measurement, first, the carriage 70 at the standby position on the Z-axis is moved toward the object 100 in the positive Z-axis direction. As a detection face 220*a* of the second detector 220 contacts the object 100, the second detector 220 moves in the negative Z-axis direction relative to the carriage 70. As the second detector 220 moves in the negative Z-axis direction, the second detector 220 presses the first detector 210 in the negative Z-axis direction. Then, as the first detector 210 moves in the negative Z-axis direction relative to the carriage 70, the first detector 210 presses the push switch 213 toward the carriage 70. Accordingly, the push switch 213 is operated, and the contact detection unit 200 detects the position of the surface of the object 100. At this time, the position data of the carriage 70 is stored in the storage unit 501 of the liquid discharge apparatus 1000. The above-described operation is performed multiple times from the drawing start position P1 to the drawing end position P2 in the drawing area 100*a* to acquire data indicating the surface shape of the drawing area 100*a*.

Figure 14:
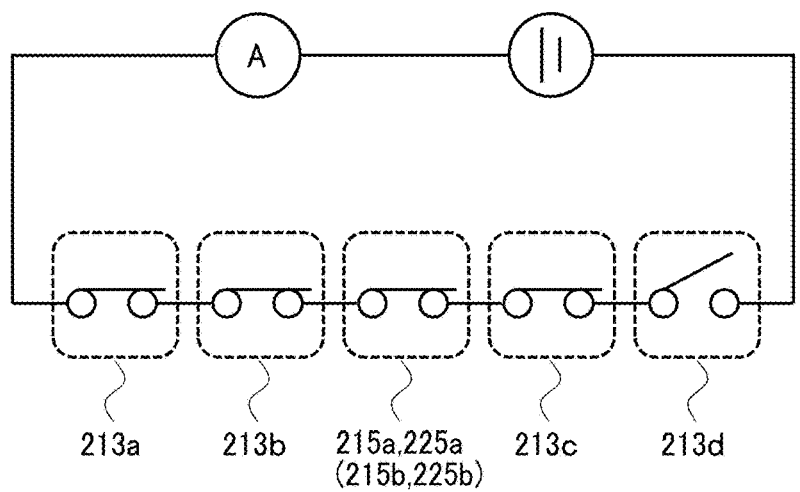
FIG. 14 is a schematic diagram illustrating an example of the electrical connection of the contact detection unit.

FIG. 14 is a schematic diagram illustrating an example of an electrical connection of the contact detection unit 200. The push switches 213 and the detection plates 215*a* and 215*b* provided in the first detector 210 and the flat springs 225*a* and 225*b* provided in the second detector 220 form the series connection circuit. FIG. 14 illustrates a state in which the push switch 213*d* among the four push switches 213 detects the position of the object 100. The position and the number of the push switches 213 to be operated change depending on the surface shape of the object 100. In the above configuration, the push switch 213 is turned off by the pressing force when the surface position of the object 100 has been detected. When the push switch 213 is turned off, the series connection circuit is in the non-conductive state. At this time, the coordinate data, which indicates the surface position of the object 100 at the current position, is stored in the storage unit 501.

FIG. 15 is a schematic diagram illustrating a case in which coordinate data of the object 100 is automatically acquired. After setting the drawing start position P1 and the drawing end position P2 from the control panel 503, a user sets X grid lines 100*b* and Y grid lines 100*c* with certain setting values. The setting values include designation of the number of grid lines or the interval between grid lines. After the X grid lines 100*b* and the Y grid lines 100*c* are set, the liquid discharge apparatus 1000 performs the position measurement of the surface of the object 100 at the intersections of the X grid lines 100*b* and the Y grid lines 100*c*, and automatically acquires coordinate data (three dimensional coordinate data of X, Y, and Z).

The user can obtain the coordinate data at fine intervals or at coarse intervals according to the setting value of the grid lines set by the user. The user may set only the drawing start position P1 and the grid lines, and the drawing end position P2 may be determined in accordance with the grid lines. Further, when a collision object such as a protrusion that affects drawing is present at a certain portion in the drawing area 100*a* of the object 100, the liquid discharge apparatus 1000 may perform the position measurement of the certain portion having the X and Y coordinates specified by the user, and add position data in the position measurement to the coordinate data.

Figure 16A:
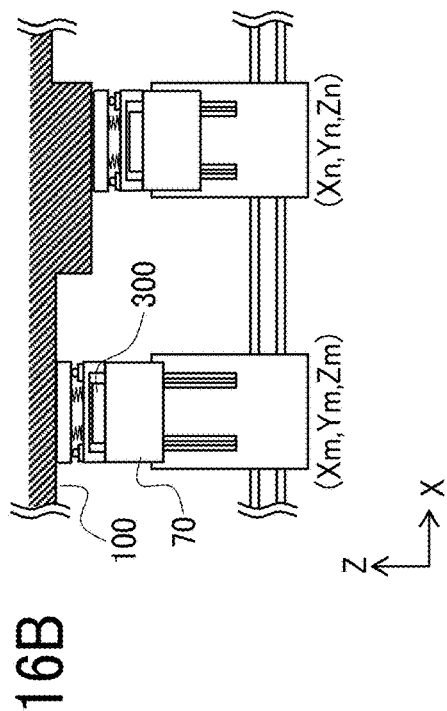
FIGS. 16A to 16D are schematic views illustrating a positional relation between the carriage and a surface shape of the object in the position measurement.
Figure 16B:
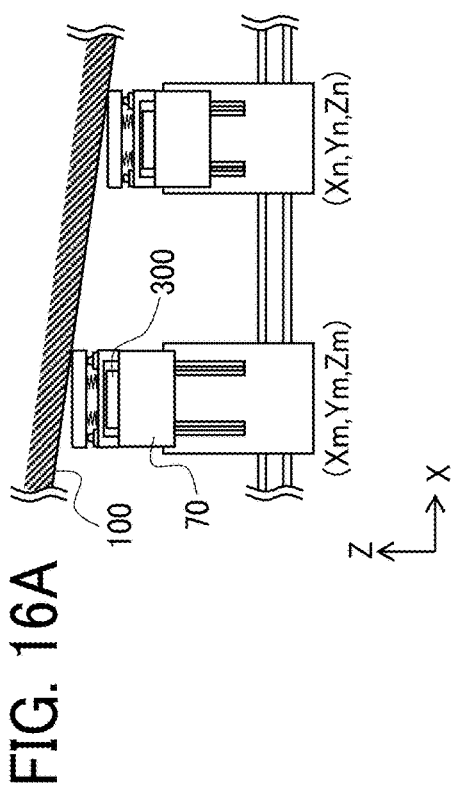
Figure 16C:
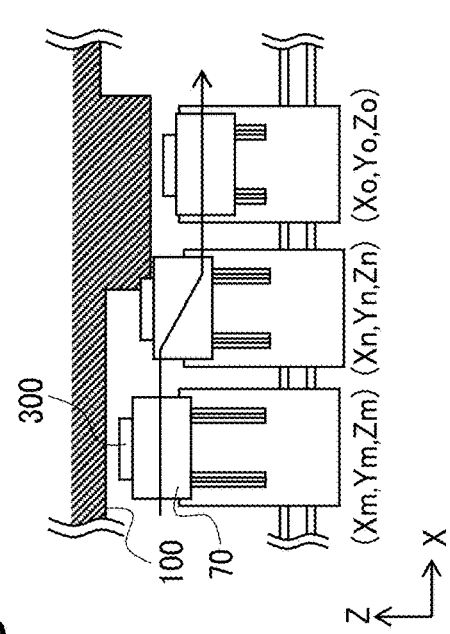
Figure 16D:
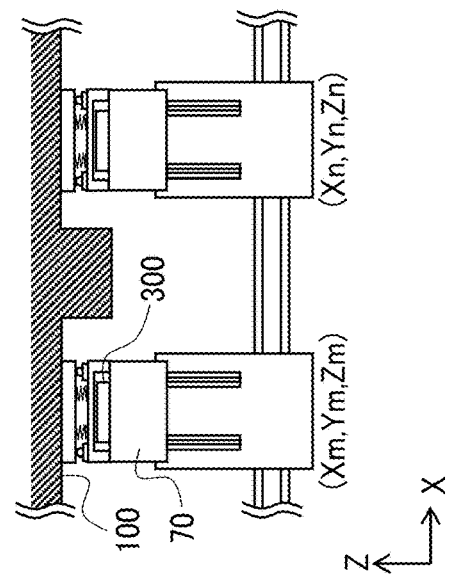

FIGS. 16A to 16D are schematic views illustrating a positional relation between the carriage 70 and the surface shape of the object 100 in the position measurement. FIG. 16A illustrates a case in which the surface of the object 100 is inclined, and FIGS. 16B, 16C and 16D illustrate a case in which a protrusion is present on the surface of the object 100.

As illustrated in FIG. 16A, when the object 100 is inclined with respect to the liquid discharge apparatus 1000, coordinates between two points of coordinates (Xm, Ym, Zm) and coordinates (Xn, Yn, Zn) are acquired by proportional calculation. Thus, during the ink discharge, the carriage 70 moves along the inclination of the object 100 so that the distance between the object 100 and the head 300 is constant. In the case in which the coordinates between two points are acquired by the proportional calculation described above, the liquid discharge apparatus 1000 may erroneously recognize a protrusion or a step between the two points of the coordinates (Xm, Ym, Zm) and the coordinates (Xn, Yn, Zn) as illustrated in FIG. 16B as an inclined surface. As illustrated in FIG. 16C, when a protrusion is present between the coordinates of two points, the liquid discharge apparatus 1000 may overlooks the protrusion. Further, as illustrated in FIG. 16D, even when the liquid discharge apparatus 1000 recognizes the presence of a protrusion in the position measurement, the carriage 70 may fail to avoid the protrusion and may collide with the protrusion.

The reason why such situations occur is that the movement of the carriage 70 is different between the position measurement and the ink discharge. In the position measurement, the carriage 70 is moved along the X-axis and Y-axis. After reaching the measurement point, the carriage 70 is moved along the Z-axis. On the other hand, in the ink discharge to the object 100, the carriage 70 is continuously moved along in the X-axis, the Y-axis, and the Z-axis while keeping the distance between the object 100 and the carriage 70 constant.

Therefore, in the present disclosure, the liquid discharge apparatus 1000 executes a process in which position data in the position measurement is verified after the position measurement and before the ink discharge (i.e., the verification of the position data). In this verification, the carriage 70 is moved relative to the object 100 in accordance with the coordinate data indicating the movement trajectory of the carriage 70 obtained based on the position data in the position measurement to check the presence or absence of a protrusion or the like overlooked in the position measurement. The movement of the carriage 70 in the verification is the same as the movement in the ink discharge except that ink is not discharged. Therefore, if a new protrusion or the like is not present in the verification, failure of drawing does not occur in the actual ink discharge. The verification is described in further detail later.

Figure 17A:
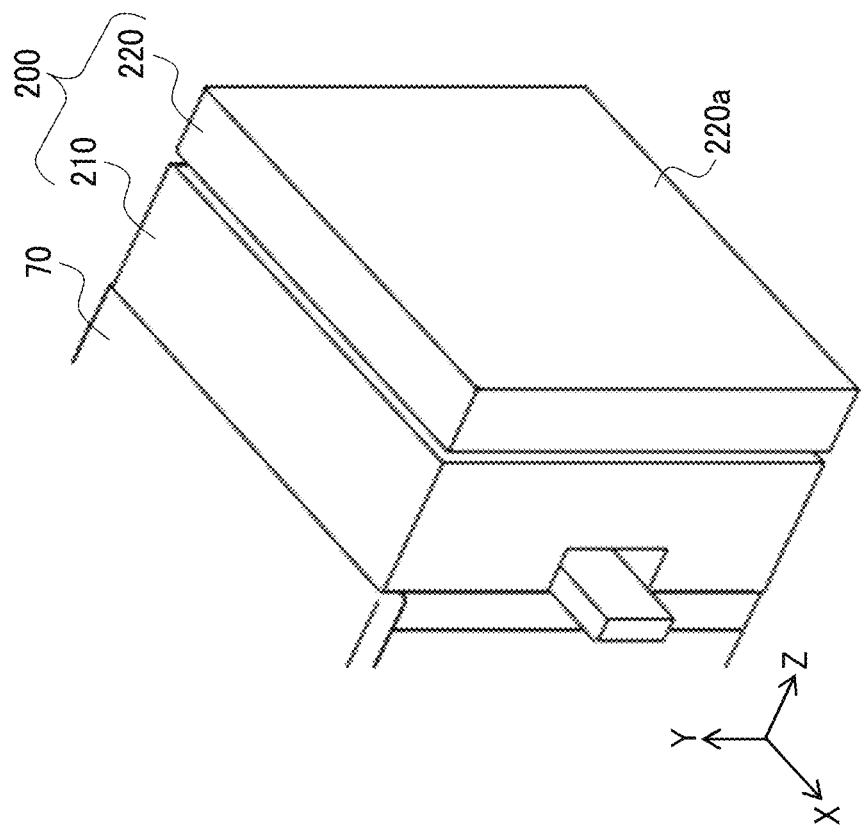
FIGS. 17A and 17B are schematic perspective views illustrating a relation between a detection face of the contact detection unit and a liquid discharge face of the carriage.
Figure 17B:
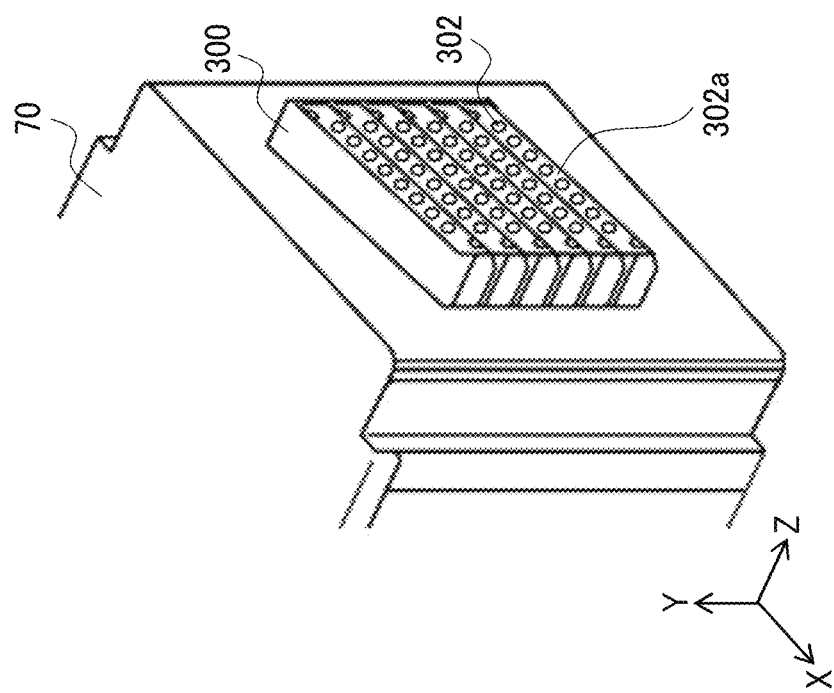

FIGS. 17A and 17B are schematic perspective views illustrating a relation between the detection face 220a of the contact detection unit 200 and the liquid discharge face (nozzle face) 302a. FIG. 17A illustrates the detection face 220a of the contact detection unit 200, and FIG. 17B illustrates the liquid discharge face (nozzle face) 302a of the nozzles 302 in the carriage 70. In FIG. 17A, the contact detection unit 200 attached to the carriage 70 includes the first detector 210 and the second detector 220. The position of the carriage 70 relative to the object 100 is measured by the contact of the detection face 220a of the second detector 220 with the object 100. On the other hand, the carriage 70 has the nozzle 302, which is an example of a liquid discharge port, at a portion to which the contact detection unit 200 is attached. In the present embodiment, the heads 300 having a plurality of nozzles 302 is mounted on the carriage 70. The plurality of nozzles 302 forms the liquid discharge face (nozzle face) 302a.

In FIG. 17B, the heads 300 includes six heads arranged along the Y-axis, and each head has eight nozzles 302 along the X-axis. That is, the head 300 has 48 nozzles 302. In the present embodiment, the surface formed by the 48 nozzles 302 is defined as the liquid discharge face (nozzle face) 302a. Alternatively, the surface having a shape corresponding to the exterior of the head 300 may be defined as the liquid discharge face (nozzle face) 302a.

The number and arrangement of the nozzles 302 are not limited to the above-described embodiment. The nozzles 302 may be arranged in a row in the vertical or horizontal direction instead of the two dimensional arrangement in the vertical and horizontal directions as illustrated. Further, the number of nozzles 302 may be one instead of two or more.

The above description is based on the example in which the detection face 220a of the second detector 220 is larger in area than the liquid discharge face 302a of the carriage 70. However, the height (along the Y-axis), the width (along the X-axis), and the thickness (along the Z-axis) of the detection face 220a may be appropriately changed in accordance with the surface shape or the surface state of the object 100 to be measured. Here, the area of the detection face 220a refers to the area of a projection surface of the detection face 220a projected onto the liquid discharge face 302a from the object 100 side along the Z-axis. For example, when the detection face 220a is larger in area than the liquid discharge face 302a as illustrated in FIGS. 17A and 17B, the liquid discharge face 302a falls within the projection surface of the detection face 220a from the object 100 side.

Figure 18A:
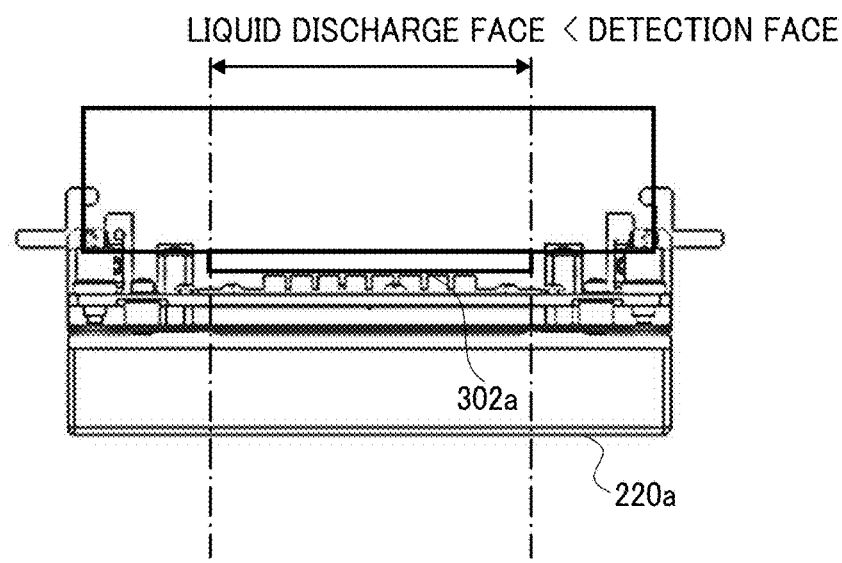
FIGS. 18A to 18C are schematic views of the contact detection unit having the detection face of different size.
Figure 18B:
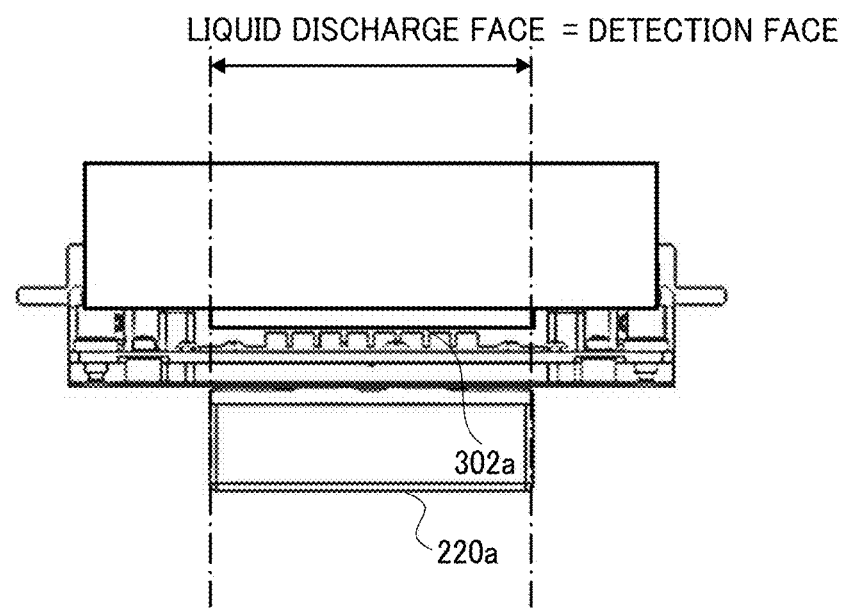
Figure 18C:
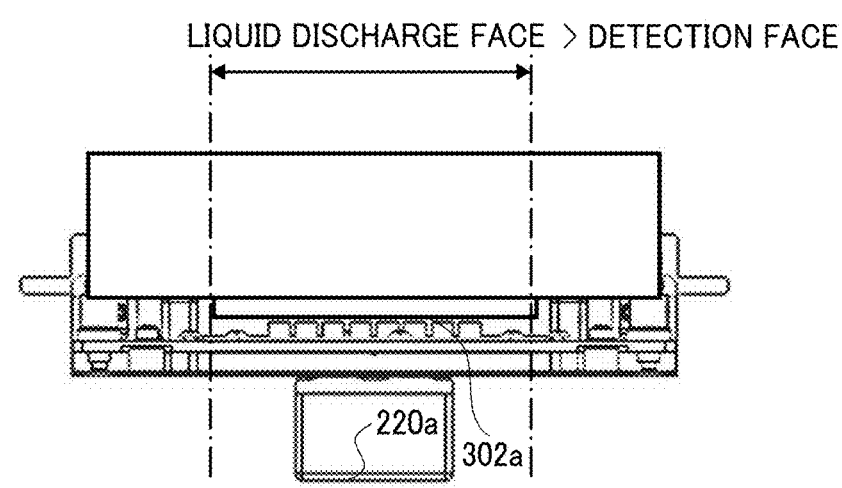

FIGS. 18A to 18C are schematic views of the contact detection unit 200 having the detection face 220a of different area. FIG. 18A illustrates a case in which the detection face 220a of the second detector 220 is larger in area than the liquid discharge face 302a. FIG. 18B illustrates a case in which the detection face 220a of the second detector 220 is equivalent in area to the liquid discharge face 302a. FIG. 18C illustrates a case in which the detection face 220a of the second detector 220 is smaller in area than the liquid discharge face 302a.

As illustrated in FIG. 18A, in the case in which the detection face 220a of the second detector 220 is larger in area than the liquid discharge face 302a, a wide range of the object 100 can be detected at a time in the position measurement of the object 100. Therefore, the position detection can be performed in a short time when the object 100 has a substantially flat surface. As illustrated in FIG. 18B, in the case in which the detection face 220a of the second detector 220 is equivalent in area to the liquid discharge face 302a, the position detection can be performed at an interval corresponding to the width of the head 300. As illustrated in FIG. 18C, in the case in which the detection face 220a of the second detector 220 is smaller in area than the liquid discharge face 302a, the position detection of the object 100 can be finely performed. Therefore, even when the object 100 has a collision object such as a protrusion or the like at a narrow interval, the collision object can be prevented from being overlooked.

As described above with reference to FIG. 18A, in the contact detection unit 200, the detection face 220a that contacts the object 100 to detect the position of the object 100 relative to the carriage 70 has a larger area than the liquid discharge face 302*a* of the nozzles 302. As a result, a wide range can be detected at a time, and the position detection can be completed in a short time for the flat object 100.

As described above with reference to FIG. 18B, in the contact detection unit 200, the detection face 220*a* that contacts the object 100 to detect the position of the object 100 relative to the carriage 70 has an area equivalent to the area of the liquid discharge face 302*a* of the nozzles 302. As a result, the position can be accurately detected at an interval corresponding to the width of the head 300 used for actual ink discharge.

As described above with reference to FIG. 18C, in the contact detection unit 200, the detection face 220*a* that contacts the object 100 to detect the position of the object 100 relative to the carriage 70 has a smaller area than the liquid discharge face 302*a* of the nozzles 302. As a result, the position of the object 100 can be finely detected, thereby preventing a collision object on the object 100 from being overlooked.

Next, the verification of the position data is described. The liquid discharge apparatus 1000 according to the present disclosure executes the process of verifying the position data in the position measurement after the position measurement and before the ink discharge. In this verification, the carriage 70 is moved relative to the object 100 in accordance with the coordinate data indicating the movement trajectory of the carriage 70 obtained based on the position data in the position measurement to check the presence or absence of a protrusion or the like overlooked in the position measurement. The movement of the carriage 70 in the verification is the same as the movement in the ink discharge except that ink is not discharged.

Figure 19:
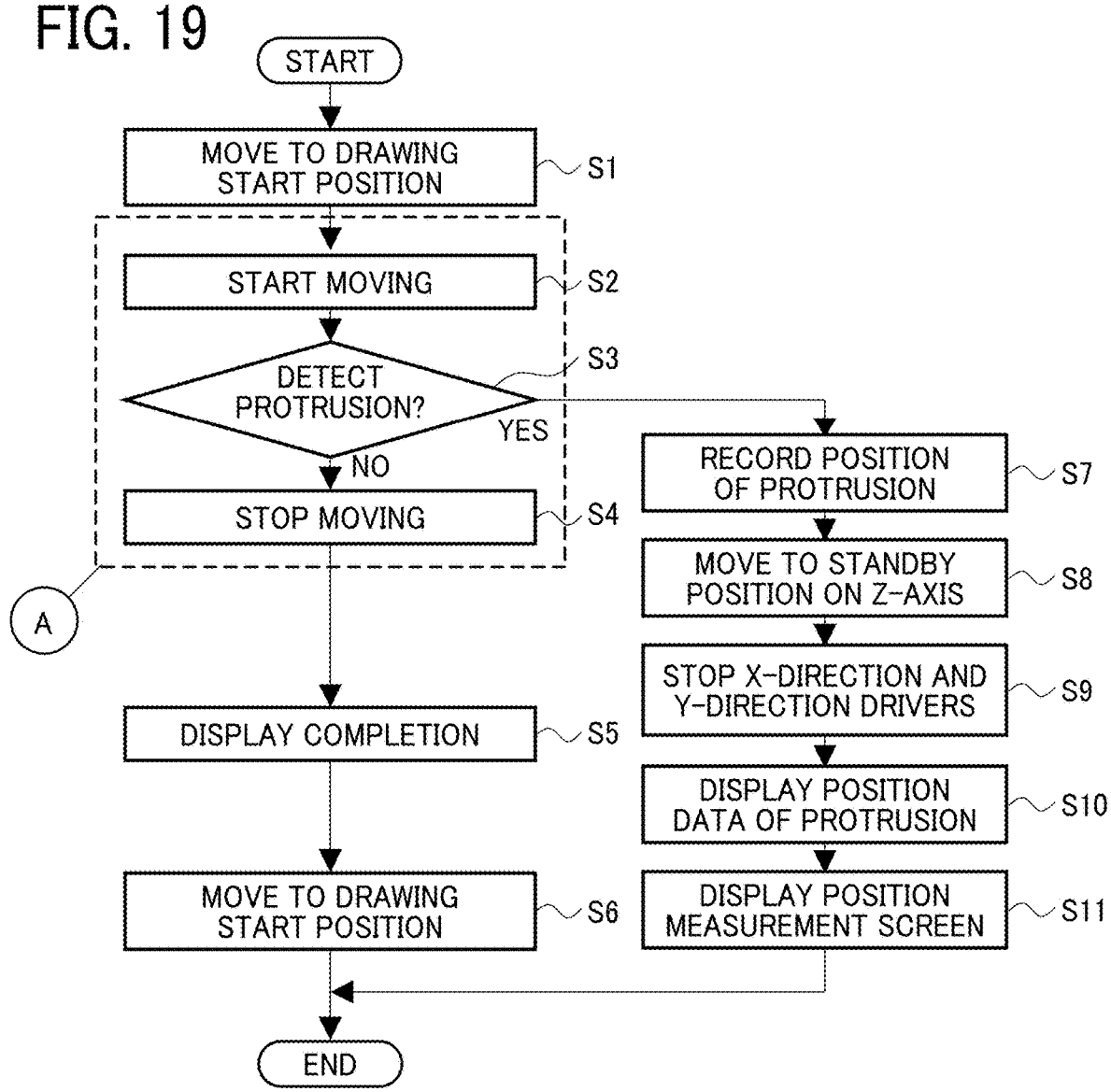
FIG. 19 is a flowchart illustrating a verification of position data according to an embodiment of the present disclosure.

FIG. 19 is a flowchart illustrating the verification of the position data. First, the carriage 70 to which the contact detection unit 200 is attached moves to the drawing start position P1 set by the user on the control panel 503 (step S1). Next, the carriage 70 starts moving from the drawing start position P1 under control of the controller 500 of the liquid discharge apparatus 1000 (step S2).

The controller 500 determines three dimensional (X, Y, and Z) coordinates indicating the movement trajectory of the carriage 70 based on the position data detected by the position detector (the push switches 213) in the position measurement. Then, the controller 500 moves the carriage 70 toward the drawing end position P2 set by the user on the control panel 503 in accordance with the three dimensional coordinate data. While the carriage 70 moves, the contact detection unit 200 attached to the carriage 70 detects a protrusion of the object 100 (step S3). When the contact detection unit 200 does not detect a protrusion while the carriage 70 moves from the drawing start position P1 to the drawing end position P2, the carriage 70 stops moving (step S4). Detailed description of a section A of the flowchart is deferred.

As the movement of the carriage 70 is completed, the controller 500 of the liquid discharge apparatus 1000 displays that the verification is completed on the display 502 to indicate the completion of the verification to a user (step S5). Then, the carriage 70 moves to the drawing start position P1 (step S6). The carriage 70 that has moved to the drawing start position P1 stands by in preparation for the ink discharge to the object 100.

On the other hand, when the contact detection unit 200 detects a protrusion while the carriage 70 moves from the drawing start position P1 to the drawing end position P2, the controller 500 of the liquid discharge apparatus 1000 records position data indicating the position of the protrusion (step S7). For example, in the present embodiment, the position data is stored in the storage unit 501 of the liquid discharge apparatus 1000 to record the position of the protrusion.

Next, the controller 500 of the liquid discharge apparatus 1000 causes the Z-direction driver 92 to move the carriage 70 in the negative Z-axis direction, and the carriage 70 moves to the standby position on the Z-axis (step S8). Thus, the carriage 70 is retracted away from the protrusion. The controller 500 of the liquid discharge apparatus 1000 stops the X-direction driver 72 and the Y-direction driver 82 to stop the carriage 70 (step S9).

Next, the controller 500 of the liquid discharge apparatus 1000 displays the position data of the protrusion on the display 502 to notify the user (step S10). Then, a display screen of the control panel 503 transitions to the position measurement screen (step S11). On the position measurement screen, the user adds the position data of the protrusion to the original position data in the position measurement as appropriate. The position data of the protrusion may be manually added by the user after the user confirms the state of the object 100 and determines whether to add the position data. Alternatively, the position data may be automatically added by the liquid discharge apparatus 1000.

As described above, when the contact detection unit 200 detects a protrusion in step S3, the position data of the protrusion is added to the original position data in the position measurement, and the process is executed again from step S1. When the contact detection unit 200 does not detect the protrusion while the carriage 70 moves from the drawing start position P1 to the drawing end position P2, the verification is completed, and the process proceeds to steps of actually discharging ink toward the object 100. After the verification is completed, the process does not necessarily proceed to the ink discharge. After the first verification, the position measurement may be performed again. By repeating the position measurement of the object 100 and the verification of the position data, three dimensional coordinate data of the object 100 can be acquired more accurately, and the ink discharge suitable for the shape of the object 100 can be performed.

The three dimensional coordinate data once created by the position measurement and the verification is stored in the storage unit 501 of the liquid discharge apparatus 1000. Accordingly, the three dimensional coordinate data is available when the ink discharge is performed on the object 100 having the same shape. In addition, even when the relative position between the liquid discharge apparatus 1000 and the object 100 is changed, the coordinate data regarding the shape of the object 100 can be used. Therefore, when the object 100 has the same shape, the user can omit at least a part of the verification by using the position data in the position measurement.

In the detection of the protrusion of the object 100, the second detector 220 detects a protrusion as the protrusion of the object 100 collides with the second detector 220 of the contact detection unit 200 (detailed description is deferred). However, the protrusion may be detected not by physical contact as described above but also by optical detection using laser light or by image processing. An object to be detected is not limited to the protrusion of the object 100. When the detection is performed by optical or image processing as described above, arbitrary portion on the object 100 can be detected. For example, a hole provided in the object 100, or a place where drawing is intentionally avoided (e.g., an image already drawn or a masking portion) can be detected as a detection target.

Figure 20:
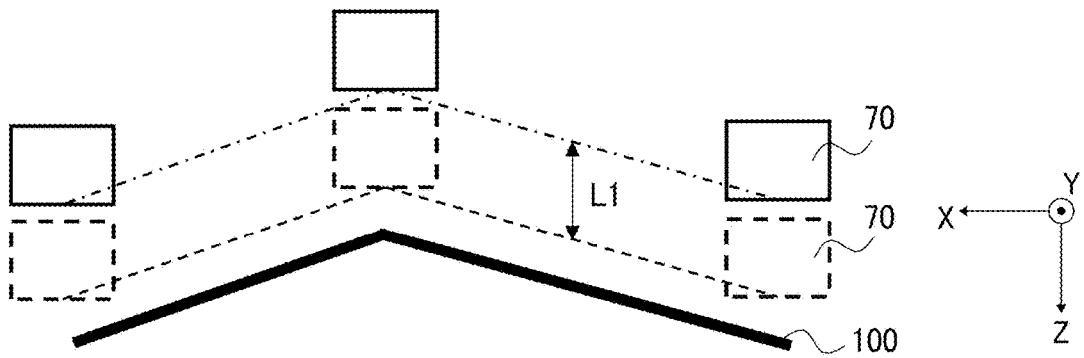
FIG. 20 is a schematic diagram illustrating a positional relation between the carriage at the time of the verification and at the time of ink discharge.

FIG. 20 is a schematic diagram illustrating a positional relation between the carriage 70 at the time of the verification and at the time of the ink discharge. In FIG. 20, the carriage 70 depicted by the solid line indicates the position relative to the object 100 in the verification of the position data. In the ink discharge to the object 100, the carriage 70 is shifted by a distance L1 in the positive Z-axis direction as depicted by the broken line. In the verification, the contact detection unit 200 is attached to the carriage 70. Therefore, the distance L1 is set in consideration of the thickness of the contact detection unit 200 along the Z-axis. In the ink discharge to the object 100, the controller 500 moves the carriage 70 to the position corrected by the distance L1 and cause the carriage 70 to discharge ink.

In addition, the movement trajectory and the moving speed of the carriage 70 in the verification of the position data are set to the same as the setting in the ink discharge to the object 100. When a liquid discharge apparatus discharges ink to an object such as a body of a car, a truck, or an aircraft, the liquid discharge apparatus is a large system. Accordingly, the rails and the apparatus frame may be bent due to the weights of the carriage 70, the X-axis rail 101, Y-axis rail 102, and Z-axis rail 103 and the inertia force caused by the movement of the carriage 70. Therefore, the verification of the position data is preferably performed in accordance with the movement of the carriage 70 when the ink is actually discharged to the object 100. If the setting of the movement trajectory and the moving speed of the carriage 70 in the verification of the position data is the same as the setting in the ink discharge to the object 100, the position data along the movement trajectory of the carriage 70 can be accurately verified.

FIGS. 21A and 21B are schematic views illustrating an example in which a protrusion is detected in the verification. FIG. 21A illustrates a state before the protrusion is detected, and FIG. 21B illustrates a state in which the protrusion is detected. A description is given below of the verification when a protrusion 110 overlooked in the position measurement is present on the surface of the object 100. In the state illustrated in FIG. 21A, the second detector 220 is attached to the first detector 210 at the correct position. Therefore, the detection plates 215a and 215b of the first detector 210 and the flat springs 225a and 225b of the second detector 220 contact each other, and the series connection circuit is in the electrically conductive state.

As the carriage 70 moves in the positive X-axis direction and reaches the protrusion 110, the second detector 220 collides with the protrusion 110 and does not further move in the positive X-axis direction. Since the second detector 220 is movable parallel to the movement direction of the carriage 70 relative to the first detector 210, the second detector 220 slides in the direction opposite to the movement direction of the carriage 70 due to the collision with the protrusion 110. Accordingly, the detection plates 215a and 215b of the first detector 210 are separated from the flat springs 225a and 225b of the second detector 220, and the series connection circuit is in the non-conductive state. After the protrusion 110 is detected, the process is executed based on steps illustrated in FIG. 19.

Figure 22A:
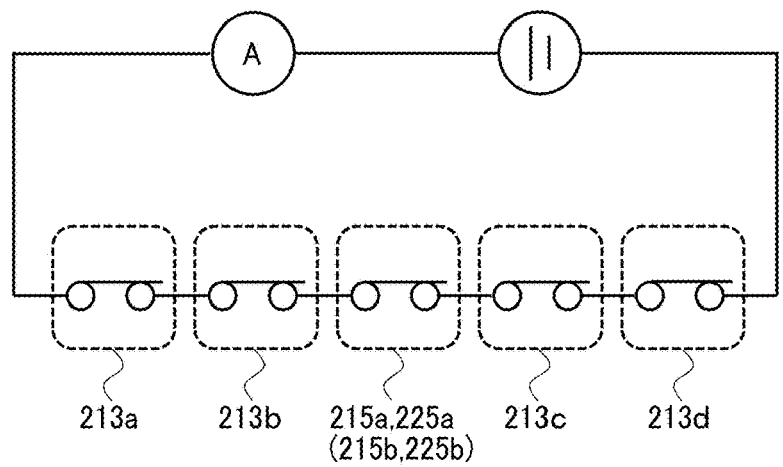
FIGS. 22A and 22B are schematic diagrams illustrating an example of an electrical connection of a series connection circuit of the contact detection unit.
Figure 22B:
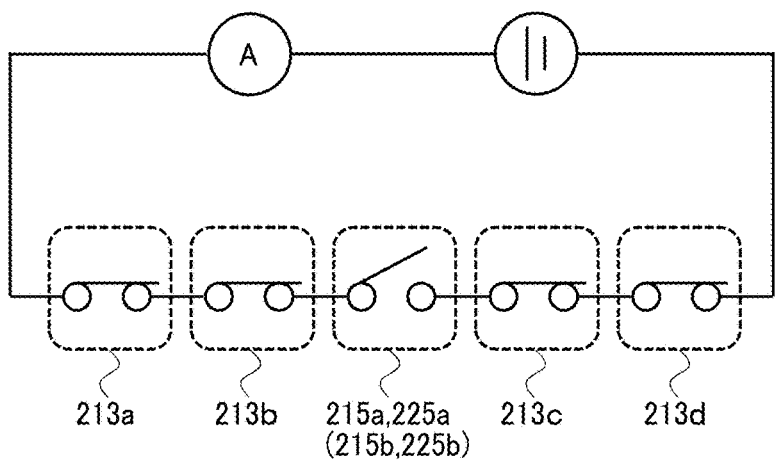

FIGS. 22A and 22B are schematic diagrams illustrating an example of an electrical connection of the series connection circuit. FIG. 22A illustrates a state in which the contact detection unit 200 is correctly attached to the carriage 70, and FIG. 22B illustrates a state in which the second detector 220 of the contact detection unit 200 is not correctly attached. FIG. 22B illustrates a state in which the protrusion 110 illustrated in FIG. 21B is detected.

Figure 23:
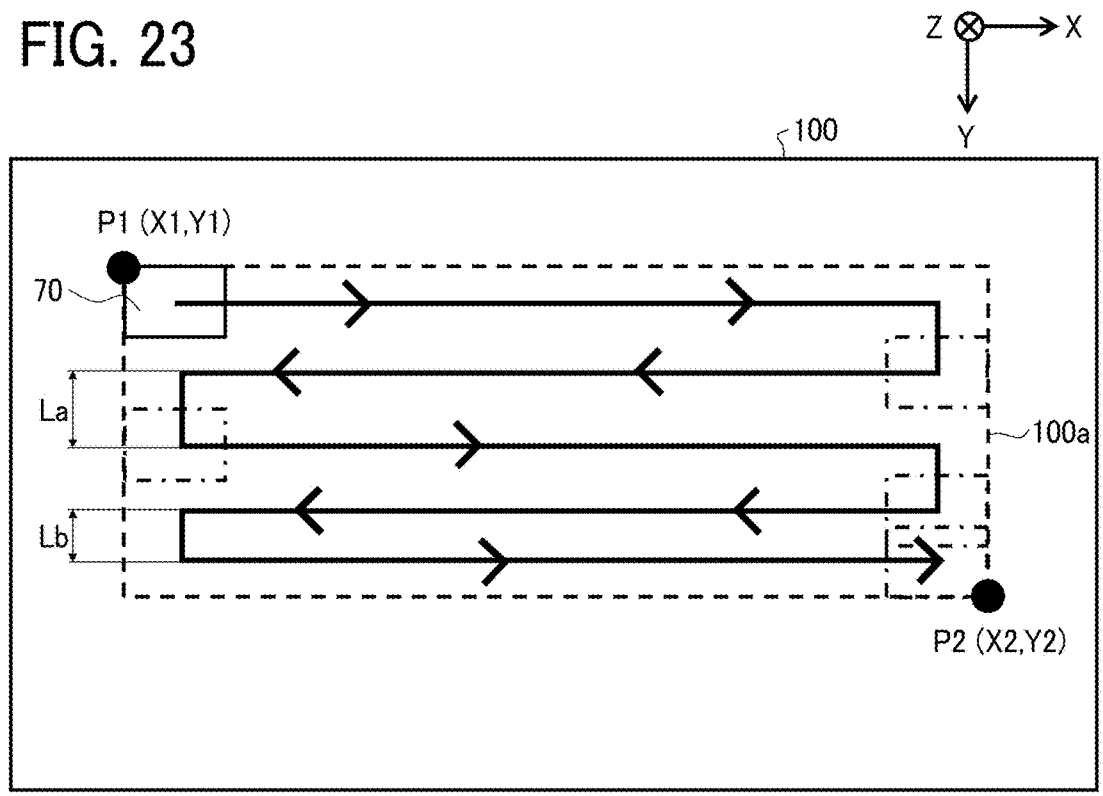
FIG. 23 is a schematic diagram illustrating an example of the movement trajectory of the carriage.

FIG. 23 is a schematic diagram illustrating an example of the movement trajectory of the carriage 70. The carriage 70 moves from the drawing start position P1 in the positive X-axis direction and reaches the return position. Then, the carriage 70 moves by a movement amount La in the positive Y-axis direction (i.e., line feed). After the line feed, the carriage 70 moves in the negative X-axis direction and reaches the other return position. Then, the carriage 70 again moves by the movement amount La in the positive Y-axis direction (i.e., line feed). While this movement is repeated, the carriage 70 moves to the drawing end position P2 along the movement trajectory indicated by the arrow.

If the movement amount La of the carriage 70 for the line feed is constant, the carriage 70 may overrun out of the drawing area 100a in the last line. If the carriage 70 moves out of the drawing area 100a, when the contact detection unit 200 detects a protrusion, the liquid discharge apparatus 1000 does not distinguish whether the protrusion is detected inside the drawing area 100a or outside the drawing area 100a.

Accordingly, the carriage 70 preferably moves from the drawing start position P1 to the drawing end position P2 without moving out of the drawing area 100a. Therefore, in the present embodiment, a movement amount Lb of the carriage 70 in the last line is smaller than the movement amount La, and the movement trajectory of the carriage 70 is controlled so that the position of the carriage 70 in the last line coincides with the drawing end position P2.

Preferably, the movement setting such as the movement amounts La and Lb is the same in the verification of the position data and the ink discharge to the drawing object 100. Instead of changing only the movement amount Lb of the last line as described above, the movement amount La and the movement amount Lb may be equalized so that the carriage 70 finally falls within the drawing area 100a.

Figure 24:
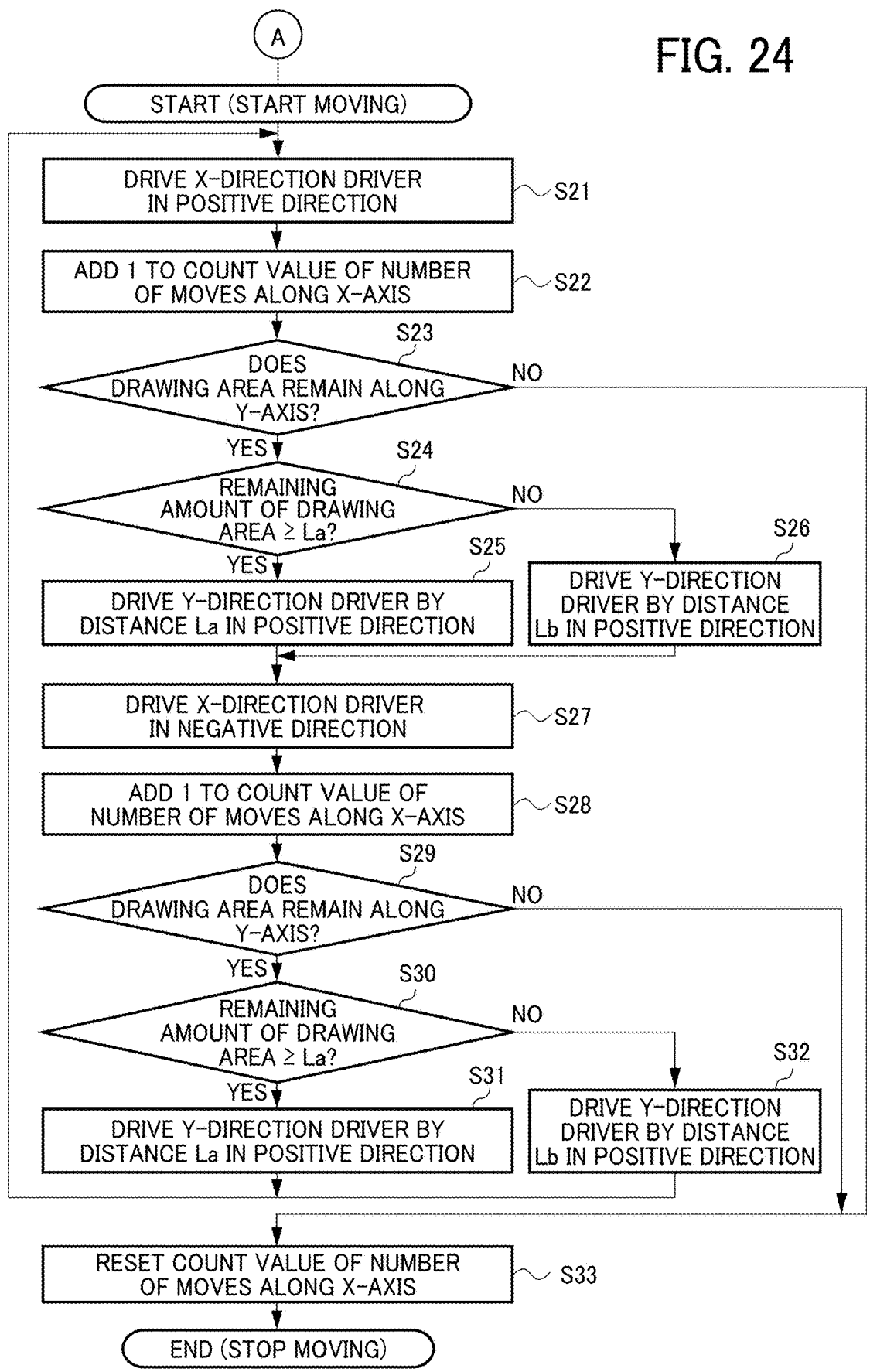
FIG. 24 is a flowchart illustrating a section A of the verification flow illustrated in FIG. 19 in detail.

FIG. 24 is a flowchart illustrating the section A of the verification flow illustrated in FIG. 19 in detail. In order to prevent the carriage 70 from moving out of the drawing area 100a, the liquid discharge apparatus 1000 determines the number of times and amount of movement of the carriage 70 while checking the remaining amount of the drawing area 100a along the Y-axis.

The controller 500 drives the X-direction driver 72 to move the carriage 70 from the drawing start position P1 in the positive X-axis direction as illustrated in FIG. 23 (step S21). As the carriage 70 moves in the positive X-axis direction, a counter that counts the number of moves of the carriage 70 along the X-axis adds 1 to a count value (step S22). When the carriage 70 reaches the end point (return position) on the positive side along the X-axis, the controller 500 determines whether the drawing area 100a remains along the Y-axis (step S23).

When the drawing area 100a does not remain, which means that the carriage 70 has reached the drawing end position P2, the counter resets the number of moves of the carriage70 along the X-axis (step S33). Then, the carriage 70 stops moving. On the other hand, when the drawing area 100a remains in step S23, the controller 500 determines whether the remaining amount is equal to or greater than the movement amount La (step S24). Here, the movement amount La corresponds to the height (length) of the carriage 70 (liquid discharge face 302a) along the Y-axis. Therefore, the terms "the remaining amount of the drawing area 100a along the Y-axis is equal to or greater than the movement amount La" means that a line feed in the positive Y-axis direction can be performed by the height of the carriage 70.

When the remaining amount is equal to or greater than the movement amount La in step S24, the controller 500 drives the Y-direction driver 82 to move the carriage 70 by the movement amount La in the positive Y-axis direction (step S25). When the remaining amount is less than the movement amount La in step S24, the controller 500 drives the Y-direction driver 82 to move the carriage 70 by the movement amount Lb in the positive Y-axis direction (step S26). As described with reference to FIG. 23, the movement amount Lb is smaller than the movement amount La, and is set so that the carriage 70 coincides with the drawing end position P2.

After the carriage 70 moves in the positive Y-axis direction in step S25 or step S26, the controller 500 drives the X-direction driver 72 to move the carriage 70 in the negative X-axis direction (step S27). As the carriage 70 moves in the negative X-axis direction, the counter that counts the number of moves of the carriage 70 along the X-axis adds 1 to the count value (step S28). When the carriage 70 reaches the end point (return position) on the negative side along the X-axis, the controller 500 determines whether the drawing area 100a remains along the Y-axis (step S29).

When the drawing area 100a does not remain, which means that the carriage 70 has reached the drawing end position P2, the counter resets the number of moves of the carriage70 along the X-axis (step S33). Then, the carriage 70 stops moving. On the other hand, when the drawing area 100a remains in step S29, the controller 500 determines whether the remaining amount is equal to or greater than the movement amount La (step S30). When the remaining amount is equal to or greater than the movement amount La in step S30, the controller 500 drives the Y-direction driver 82 to move the carriage 70 by the movement amount La in the positive Y-axis direction (step S31). When the remaining amount is less than the movement amount La in step S30, the controller 500 drives the Y-direction driver 82 to move the carriage 70 by the movement amount Lb in the positive Y-axis direction (step S32).

After the carriage 70 moves in the positive Y-axis direction in step S31 or step S32, the process returns to the step S21, and the controller 500 repeats the above-described flow until the remaining amount of the drawing area 100a runs out. As described above, the controller 500 controls the carriage 70 within the drawing area 100a so that the carriage 70 does not move out of the drawing area 100a. Therefore, the liquid discharge apparatus 1000 can accurately perform the position measurement, the verification, and the ink discharge in a determined drawing area 100a.

Figures 25, 26:
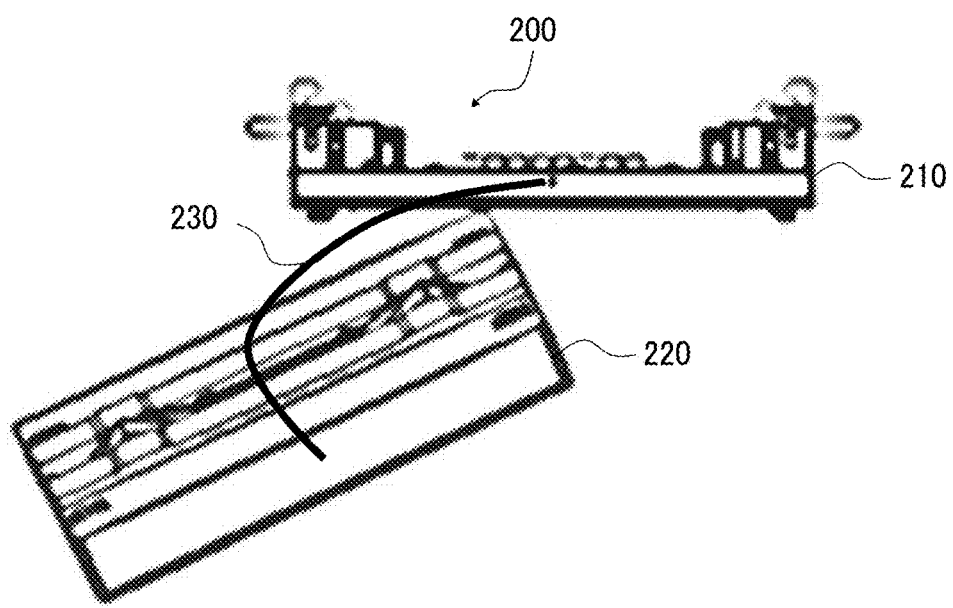
FIG. 25 is a schematic view illustrating an example of a display screen of a control panel of the liquid discharge apparatus.
FIG. 26 is a schematic view of a fall prevention component that prevents the second detector from falling off the contact detection unit.

FIG. 25 is a schematic view illustrating an example of the display screen of the control panel 503 of the liquid discharge apparatus 1000. A user can input X and Y coordinate data to determine the drawing start position P1 and the drawing end position P2 of the drawing area (print range) 100a, and select the moving speed of the carriage 70 on the control panel 503. In addition, the user can designate the three dimensional coordinate data (body data) indicating the surface shape of the object 100 and input the distance (set gap) between the head 300 and the object 100 on the control panel 503.

FIG. 26 is a schematic view of a fall prevention component that prevents the second detector 220 from falling off the contact detection unit 200. The contact detection unit 200 includes the first detector 210 and the second detector 220 that are attached to each other by the magnetic force of the magnets 214 and 224 as described above. Accordingly, if the second detector 220 moves relative to the first detector 210 by a distance equal to or greater than the size of the magnets 214 and 224 due to the detection of the protrusion, the second detector 220 may fall from the first detector 210 and may be damaged.

To prevent the second detector 220 from falling, the first detector 210 and the second detector 220 may be coupled to each other by a string-shaped component 230. The string-shaped component 230 includes a string, a wire, a chain, and the like. Note that the string, the wire, and the chain are an example of the fall prevention component. As described above, in the present embodiment, the string-shaped component 230 that prevents the second detector 220 from falling from the first detector 210 is provided between the first detector 210 and the second detector 220. Accordingly, even when the second detector 220 is detached from the first detector 210, the string-shaped component 230 can prevent the second detector 220 from falling off and from being damaged or lost.

Figure 27:
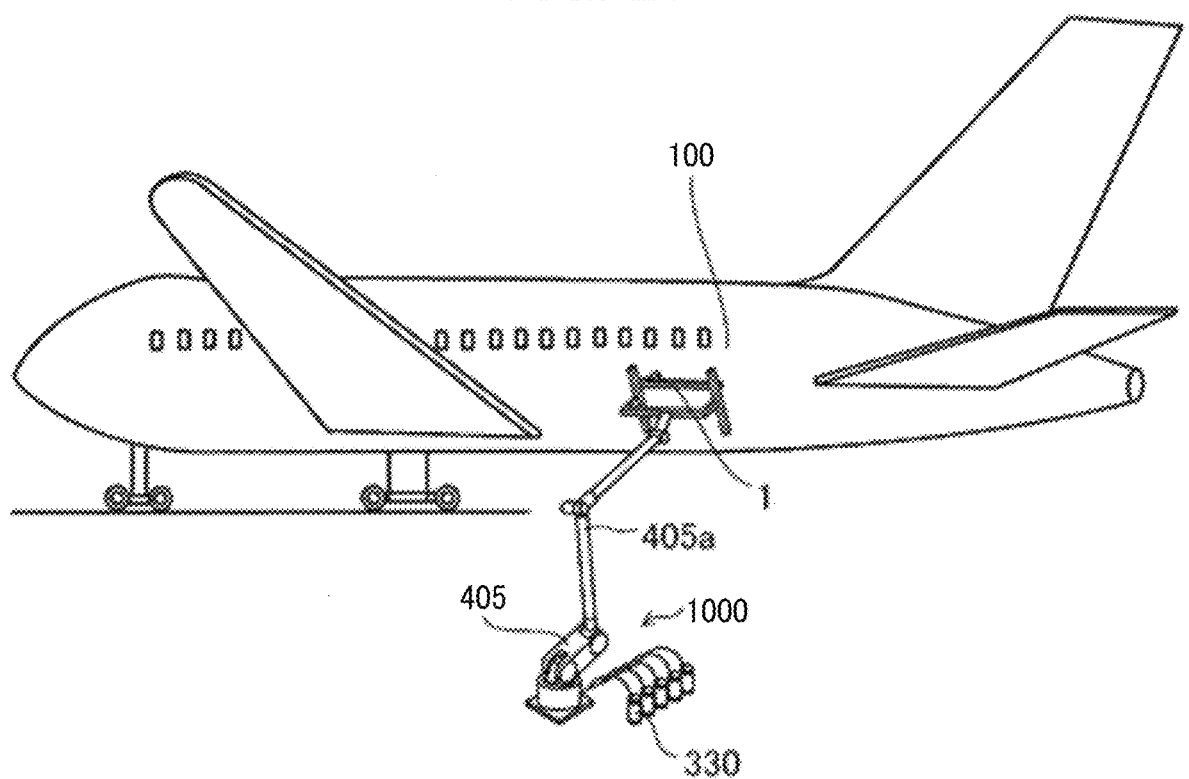
FIG. 27 is a schematic view of a liquid discharge apparatus according to a variation of the present disclosure.
Figure 28:
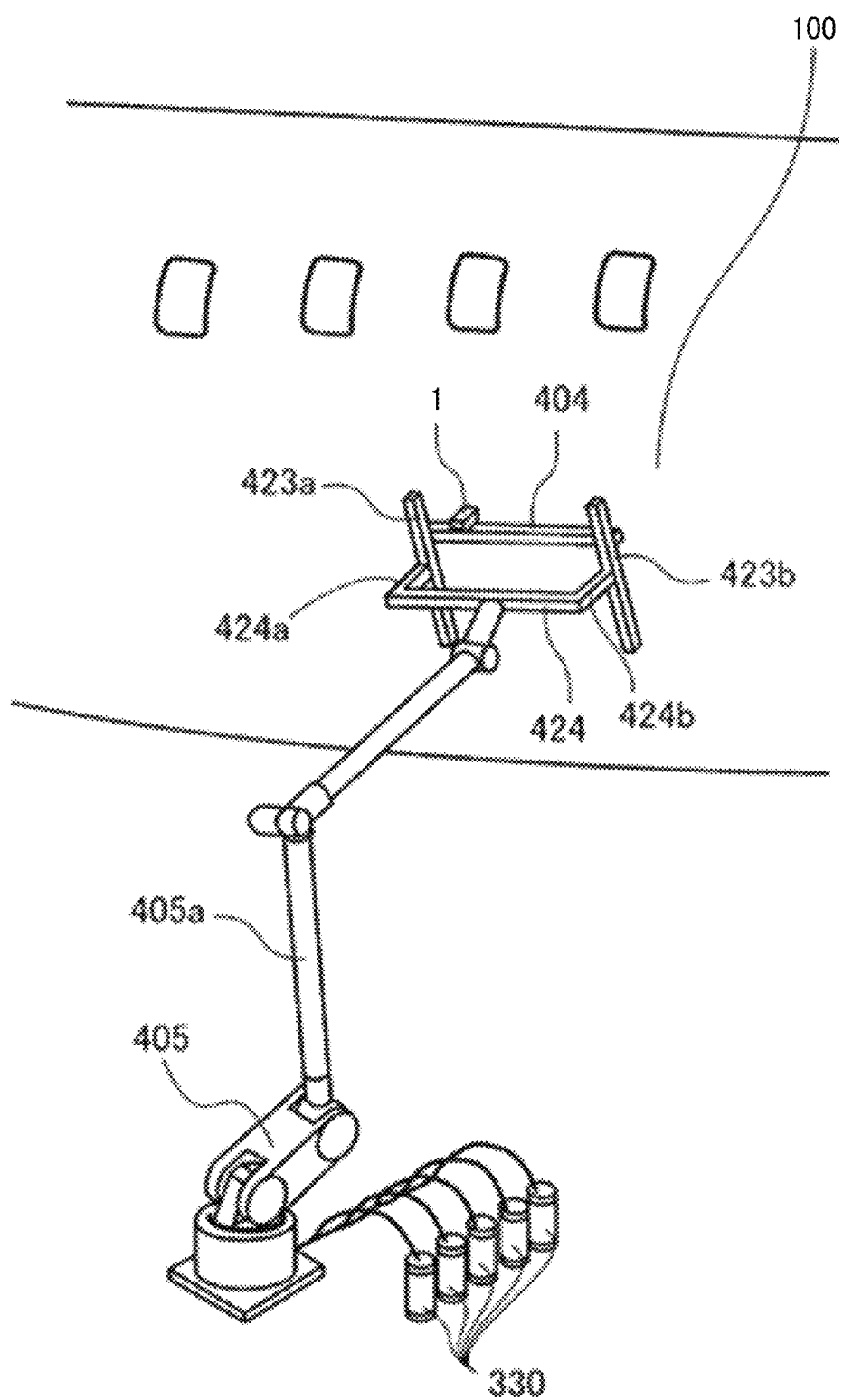
FIG. 28 is an enlarged perspective view of the liquid discharge apparatus according to the variation.
Figure 29:
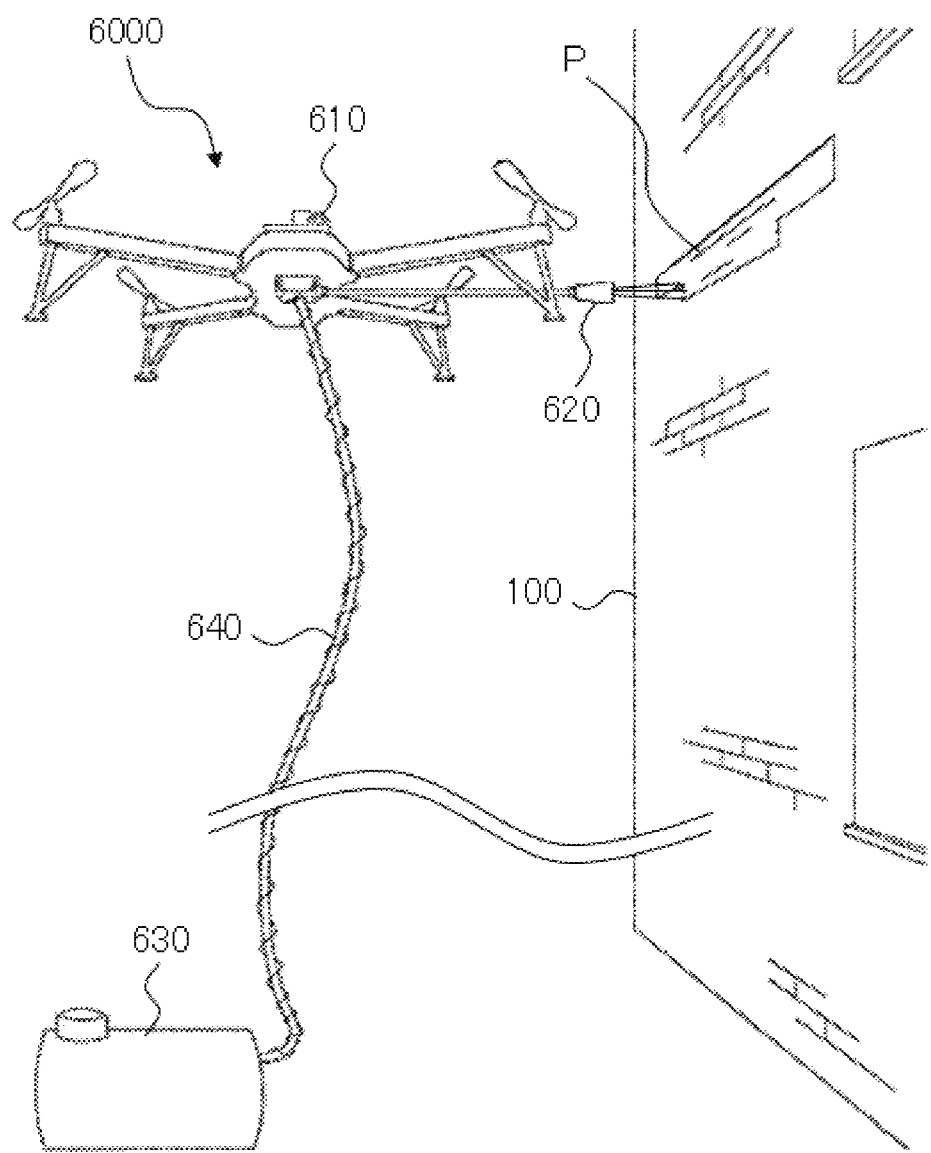
FIG. 29 is a schematic view illustrating an example of an apparatus to which the present disclosure is applied.

FIG. 27 is a schematic view of a liquid discharge apparatus 1000 according to a variation of the present disclosure. FIG. 28 is an enlarged perspective view of the liquid discharge apparatus 1000 according to the variation. The liquid discharge apparatus 1000 includes a linear rail 404 and a multi-articulated robot 405. The linear rail 404 guides a carriage 1 as a liquid discharge unit that reciprocally and linearly moves along the linear rail 404. The multi-articulated robot 405 appropriately moves the linear rail 404 to a predetermined position and holds the linear rail 404 at the predetermined position. The multi-articulated robot 405 includes a robot arm 405a that is freely movable like a human arm by a plurality of joints. The multi-articulated robot 405 can freely move a distal end of the robot arm 405a and arrange the distal end of the robot arm 405a at an accurate position.

An industrial robot of a six-axis control-type having six axes (six joints) can be used as the multi-articulated robot 405, for example. According to the multi-articulated robot 405 of the six-axis control-type, it is possible to previously teach data related to a movement of the multi-articulated robot 405. As a result, the multi-articulated robot 405 can accurately and quickly position the linear rail 404 at a predetermined position facing an object 100 (an aircraft in the present embodiment). The number of axes of the multi-articulated robot 405 is not limited to six, and a multi-articulated robot having an appropriate number of axes such as five axes or seven axes can be used.

The robot arm 405a of the multi-articulated robot 405 includes a fork-shaped support 424 bifurcated into two. A vertical linear rail 423a is attached to a tip of a left branch 424a of the support 424, and a vertical linear rail 423b is attached to a tip of a right branch 424b of the support 424. The vertical linear rail 423a and the vertical linear rail 423b are parallel to each other. Further, both ends of the linear rail 404 that movably holds the carriage 1 are supported by the vertical linear rails 423a and 423b. The carriage 1 includes, for example, the head 300 described with reference to FIG. 2 and the like, a plurality of heads 300 that discharges inks of respective colors (e.g., yellow, magenta, cyan, black, and white), or a head 300 having a plurality of nozzle rows. The inks of respective colors are respectively supplied from ink tanks 330 to the heads 300 or the nozzle rows of the head 300 of the carriage 1.

In the liquid discharge apparatus 1000, the multi-articulated robot 405 moves the linear rail 404 to a desired drawing area of the object 100, and the heads 300 are driven to draw images on the object 100 while moving the carriage 1 along the linear rail 404 according to drawing data. When the liquid discharge apparatus 1000 ends drawing of one line, the liquid discharge apparatus 1000 causes the vertical linear rails 423a and 423b of the multi-articulated robot 405 to move the heads 300 of the carriage 1 from the one line to the next line. The liquid discharge apparatus 1000 repeats the above-described operation to draw images on the desired drawing area of the object 100. Also in the above-described variation, the contact detection unit 200 is attached to the carriage 1 as a liquid discharge unit. The liquid discharge apparatus 1000 performs the ink discharge after the position measurement and the verification, thereby obtaining the above-described effect according to the present disclosure.

Next, other examples to which the present disclosure is applied are described with reference to FIGS. 29 to 34. The present disclosure can also be applied to an unmanned aerial vehicle 6000 such as a drone illustrated in FIG. 29. The unmanned aerial vehicle 6000 includes a detector 610 such as a rangefinder mounted thereon and controls the position of the unmanned aerial vehicle 6000 based on a detection result of the detector 610. The unmanned aerial vehicle 6000 further includes a liquid discharge unit 620 including a head that discharges liquid such as ink. Liquid stored in a liquid tank 630 is supplied to the liquid discharge unit 620 via a tube 640. The unmanned aerial vehicle 6000 causes the head of the liquid discharge unit 620 to discharge the liquid toward an object 100 (a wall of a building in the present embodiment) based on the position controlled as described above to applies the liquid to an area to be painted P of the object 100.

Figure 30:
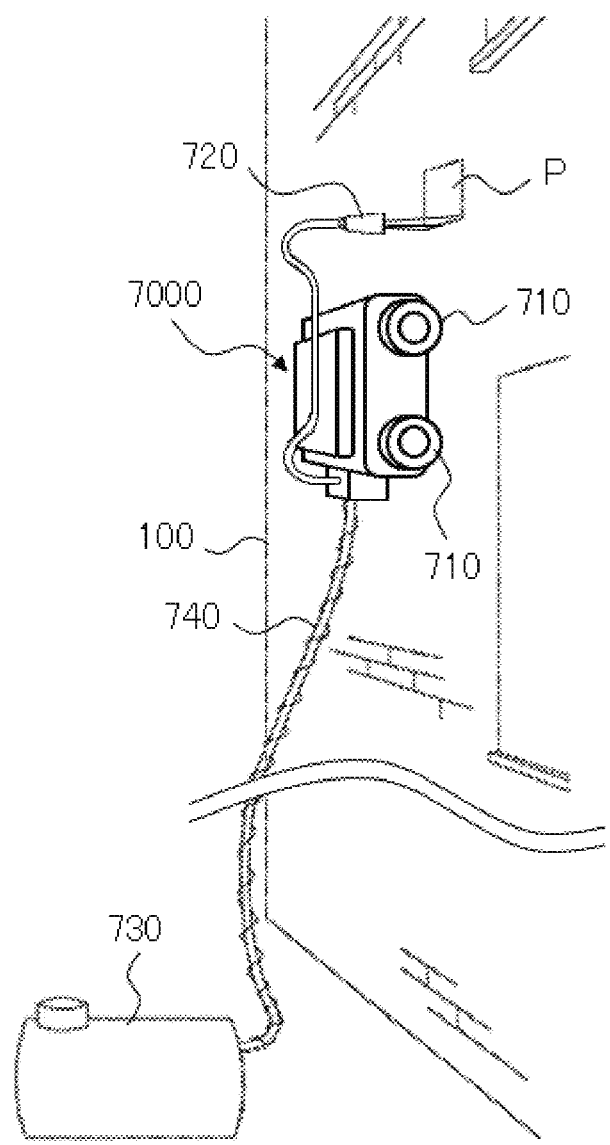
FIG. 30 is a schematic view illustrating another example of an apparatus to which the present disclosure is applied.

The present disclosure can also be applied to an unmanned vehicle 7000 such as a wall climbing robot illustrated in FIG. 30. The unmanned vehicle 7000 drives rollers 710 while sucking the object 100 (the wall of the building in the present embodiment) at the bottom of the unmanned vehicle 7000 to move on the object 100. The unmanned vehicle 7000 includes a liquid discharge unit 720 including a head that discharges liquid such as ink. Liquid stored in a liquid tank 730 is supplied to the liquid discharge unit 720 via a tube 740. The unmanned vehicle 7000 causes the head of the liquid discharge unit 720 to discharge the liquid toward the object 100 (the wall of the building in the present embodiment) to applies the liquid to an area to be painted P of the object 100.

Figure 31:
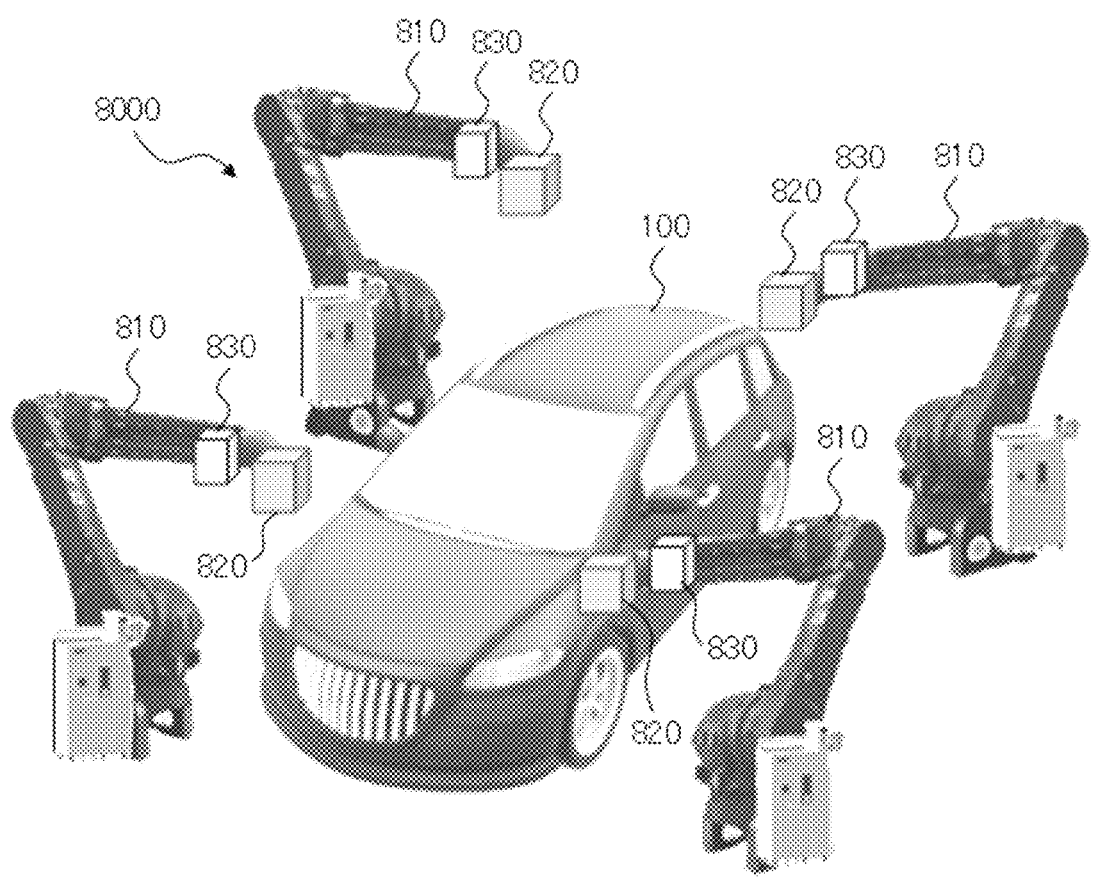
FIG. 31 is a schematic view illustrating still another example of an apparatus to which the present disclosure is applied.

The present disclosure can also be applied to a coating robot 8000 illustrated in FIG. 31 that coats, for example, a body of an automobile. The coating robot 8000 includes a robot arm 810 that is freely movable like a human arm by a plurality of joints, and further includes a liquid discharge unit 820 including a head that discharges liquid at a distal end of the robot arm 810. The robot arm 810 includes a three-dimensional (3D) sensor 830 near of the liquid discharge unit 820. The coating robot 8000 having an appropriate number of axes such as five, six, or seven axes can be used. The coating robot 8000 detects the position of the liquid discharge unit 820 relative to the object 100 (the body of the automobile in the present embodiment) by the 3D sensor 830, and moves the robot arm 810 based on the detection result to coat the object 100.

Figure 32:
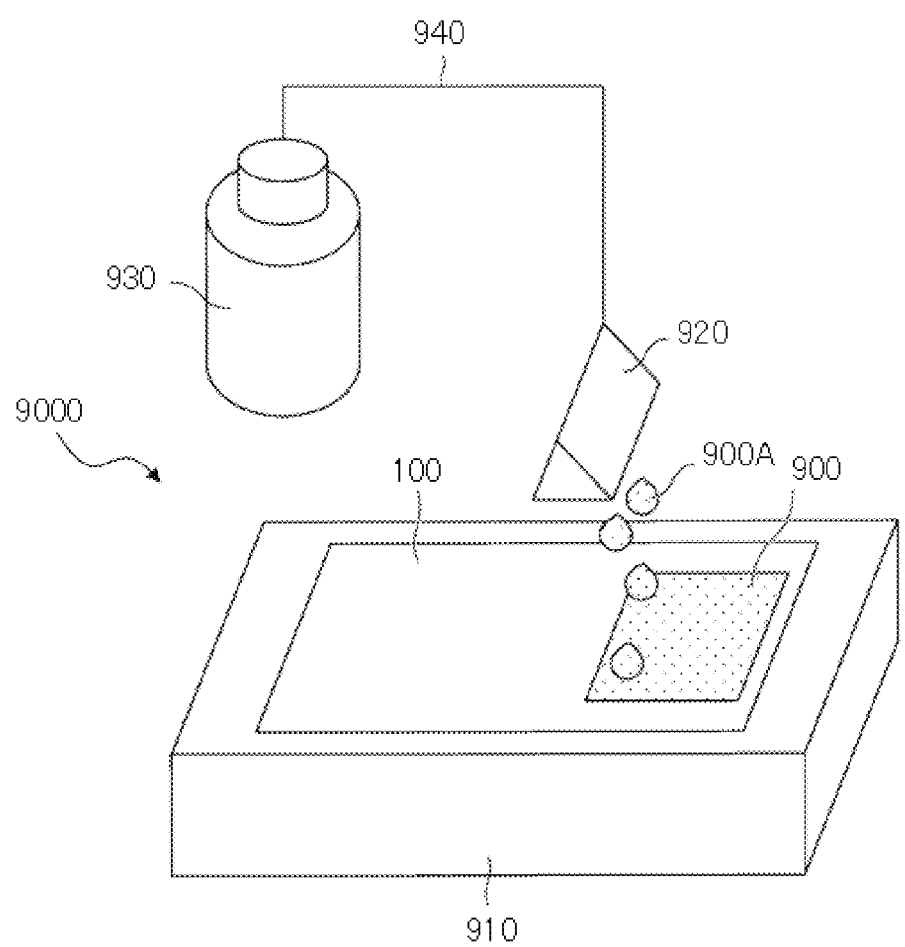
FIG. 32 is a schematic view illustrating yet another example of an apparatus to which the present disclosure is applied.

The present disclosure can also be applied to an apparatus 9000 illustrated in FIG. 32 that discharges liquid to manufacture an electrode, for example. FIG. 32 is a schematic view of the apparatus 9000 that manufactures a negative electrode used for an electrochemical element such as a primary battery, a secondary battery, or a capacitor. This apparatus 9000 includes a liquid discharge unit 920 including a head that discharges liquid. The liquid is discharged to an object 100 (a negative electrode substrate in the present embodiment) on a stage 910 by an inkjet method. A liquid tank 930 stores a liquid composition 900A for forming a negative electrode composite layer 900, and the liquid composition 900A is supplied from the liquid tank 930 to the liquid discharge unit 920 via a tube 940.

Figure 33:
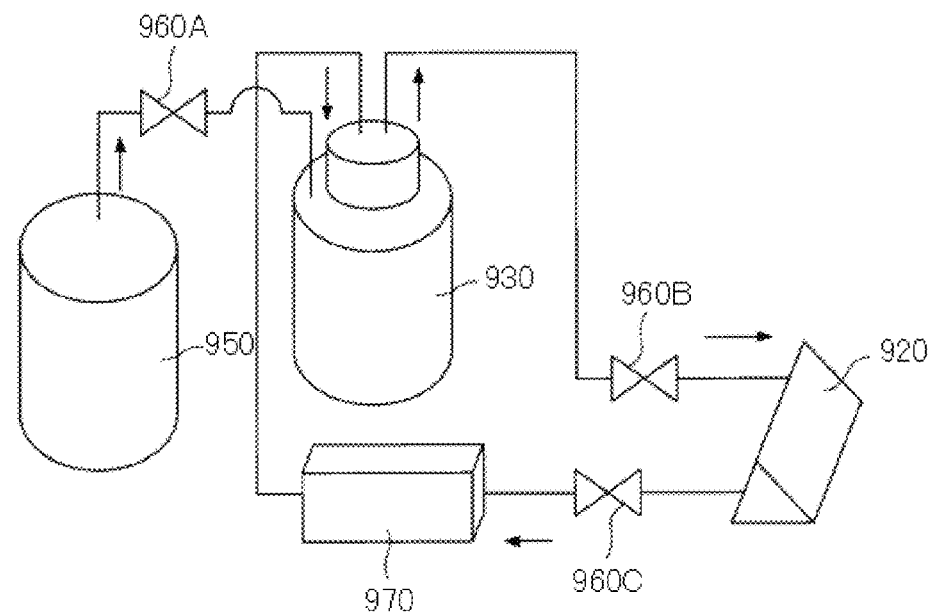
FIG. 33 is a schematic view illustrating a variation of the apparatus in FIG. 32 to which the present disclosure is applied.

As illustrated in FIG. 33, the liquid composition 900A may be circulated in the apparatus 9000. In FIG. 33, an external tank 950 is connected to the liquid tank 930 via a valve 960A, and the liquid tank 930 is connected to the liquid discharge unit 920 via a valve 960B. Further, the liquid discharge unit 920 is connected to a pump 970 via a valve 960C, and the pump 970 is connected to the liquid tank 930. In the above-described configuration, the apparatus 9000 controls the flow of the liquid composition 900A with the pump 970 and the valves 960B and 960C to circulate the liquid composition 900A, which is stored in the liquid tank 930, in the apparatus 9000.

As described above, the apparatus 9000 includes the external tank 950 and the valve 960A. The apparatus 9000 controls the valve 960A to supply the liquid composition 900A from the external tank 950 to the liquid tank 930 of the apparatus 9000 when the liquid composition 900A to be discharged decreases. As illustrated in FIG. 32, the object 100 (the negative electrode substrate) is placed on the stage 910 that is heatable, and the liquid composition 900A is discharged onto the object 100. At this time, the stage 910 may be moved relative to the liquid discharge unit 920, or the liquid discharge unit 920 may be moved relative to the object 100. The stage 910 heats and dries the liquid composition 900A on the object 100, thereby forming the negative electrode composite layer 900.

Note that drying is not limited to heating on the stage 910. For example, a drying device provided separately from the stage 910 may be used. The drying device is not particularly limited and may be appropriately selected as long as the drying device does not directly contact the liquid composition 900A. For example, a resistance heater, an infrared heater, a fan heater, or a blower can be used as the drying device. A plurality of drying devices may be provided.

Figure 34:
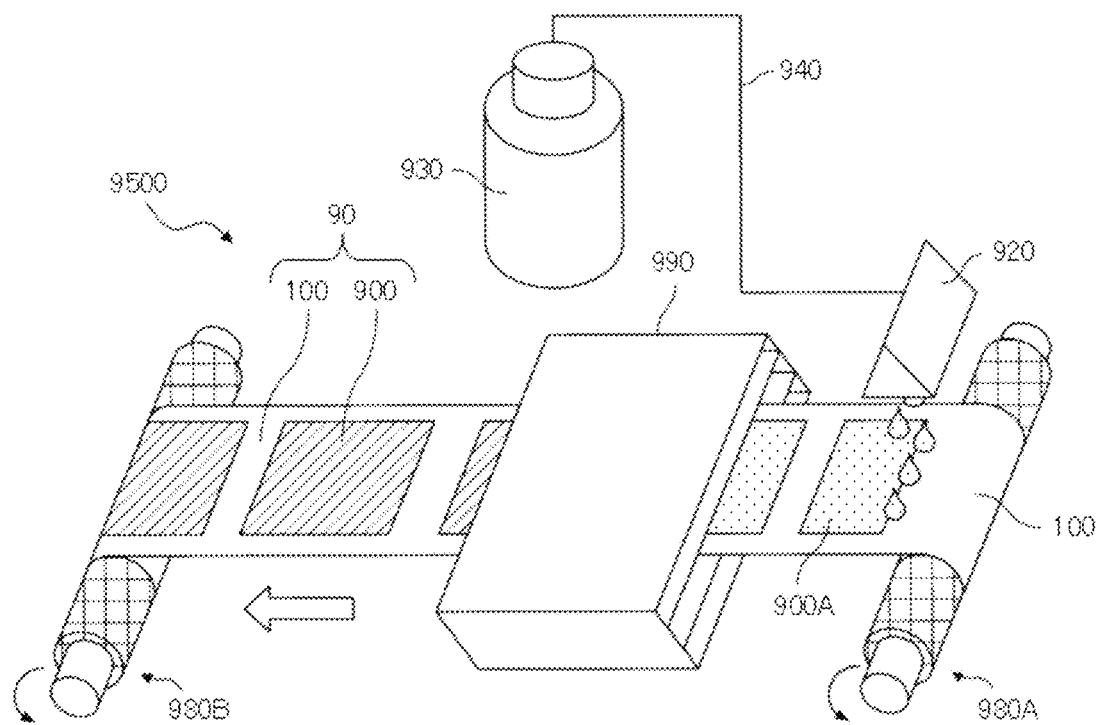
FIG. 34 is a schematic view illustrating still yet another example to which the present disclosure is applied.

The negative electrode used for the electrochemical element can also be manufactured using an apparatus 9500 illustrated in FIG. 34. In the apparatus 9500, a band-shaped object 100 (the negative electrode substrate in the present embodiment) made of stainless steel, copper or the like is wound around a cylindrical core, and the object 100 is loaded on a feed roller 980A and a winding roller 980B such that the surface of the object 100 on which the negative electrode composite layer 900 is to be formed faces upward. As the feed roller 980A and the winding roller 980B rotate counterclockwise, the object 100 moves from right to left in FIG. 34. The liquid tank 930 stores the liquid composition 900A for forming the negative electrode composite layer 900, and the liquid composition 900A is supplied from the liquid tank 930 to the liquid discharge unit 920 via the tube 940. The liquid discharge unit 920 is disposed above the object 100 between the feed roller 980A and the winding roller 980B. A plurality of liquid discharge units 920 may be provided in a direction substantially parallel or substantially perpendicular to the conveyance direction of the object 100.

The feed roller 980A and the winding roller 980B convey the object 100 carrying the liquid composition 900A to a drying device 990. As a result, the liquid composition 900A on the object 100 is dried to form the negative electrode composite layer 900, thereby forming a negative electrode 90 in which the negative electrode composite layer 900 is bonded onto the object 100 as the negative electrode substrate. Thereafter, the negative electrode 90 is cut into a desired size by punching or the like. The drying device 990 is not particularly limited and may be appropriately selected as long as the drying device 990 does not directly contact the liquid composition 900A. For example, a resistance heater, an infrared heater, or a fan heater can be used as the drying device 990. Note that the drying device 990 may be provided above or below the object 100, and a plurality of drying devices 990 may be provided.

In the apparatuses 9000 and 9500 that manufacture the negative electrode used for the electrochemical element as described above, an inkjet method is preferable in that a liquid can be applied to an aimed portion of the object 100 below the liquid discharge unit 920. In addition, the inkjet method is preferable because the surfaces of the object 100 (the negative electrode substrate) and the negative electrode composite layer 900, which are in contact with each other, can be bonded to each other. Further, the inkjet method is preferable because the film thickness of the negative electrode composite layer 900 can be formed evenly.

In the above description, the apparatus that manufactures the negative electrode used for the electrochemical element has been described as an example, but the present disclosure can also be applied to an apparatus that manufactures a positive electrode. When the positive electrode is manufactured, a positive electrode substrate is used as the object 100 instead of the negative electrode substrate, and a liquid composition for forming a positive electrode composite layer is used instead of the liquid composition 900A for forming the negative electrode composite layer 900.

The above-described embodiments are examples and, for example, the following aspects 1 to 11 of the present disclosure can provide the following advantages.

Aspect 1

According to Aspect 1, the liquid discharge apparatus 1000 includes the carriage 70 (an example of a liquid discharge unit) and the contact detection unit 200 (an example of a contact detection unit). The carriage 70 has the nozzle 302 (an example of a liquid discharge port) from which ink (an example of a liquid) is discharged toward the object 100 (an example of an object on which an image is drawn). The carriage 70 is movable along at least one of the X-axis (an example of a first axis) and the Y-axis intersecting the X-axis (an example of a second axis intersecting the first axis), and movable along the Z-axis intersecting the X-axis and the Y-axis (an example of a third axis intersecting the first axis and the second axis). The Z-axis is parallel to the direction in which ink is discharged from the nozzle 302 toward the object 100. The contact detection unit 200 detects contact of the carriage 70 with the object 100. The contact detection unit 200 is detachably attached to the carriage 70.

According to Aspect 1, the liquid discharge apparatus 1000 can be provided that prevents the carriage 70 from being damaged while moving the carriage 70 relative to the object 100.

Aspect 2

According to Aspect 2, in Aspect 1, the contact detection unit 200 includes the push switches 213 (an example of a position detector) that detect the position of the object 100 relative to the carriage 70 (i.e., position detection).

Aspect 3

According to Aspect 3, in Aspect 1 or 2, the contact detection unit 200 includes the detection plates 215a and 215b (an example of a collision object detector) that detect a collision object on the object 100, which may collide with the carriage 70 (i.e., collision object detection).

According to Aspect 2 and Aspect 3, the position detection and the collision object detection can be performed with a simple configuration.

Aspect 4

According to Aspect 4, in any one of Aspects 1 to 3, the contact detection unit 200 includes the first detector 210 (an example of a first component) detachably attached to the carriage 70 and the second detector 220 (an example of a second component) detachably attached to the first detector 210, and performs at least one of the position detection and the collision object detection in response to movement of the first detector 210 and the second detector 220.

Aspect 5

According to Aspect 5, in any one of Aspects 1 to 4, the second detector 220 is movable parallel to a movement direction of the carriage 70 relative to the first detector 210.

According to Aspect 4 and Aspect 5, the single contact detection unit 200 can perform different types of detection (i.e., the position detection and the collision object detection).

Aspect 6

According to Aspect 6, in any one of Aspects 1 to 5, the first detector 210 and the second detector 220 are attached to each other by the magnets 214 and 224 (an example of a magnetic force).

According to Aspect 6, the second detector 220 can be easily positioned relative to the first detector 210.

Aspect 7

According to Aspect 7, in any one of Aspects 1 to 6, the contact detection unit 200 includes the push switches 213 and the detection plates 215a and 215b. The push switches 213 detect the position of the object 100 relative to the carriage 70 as the second detector 220 moves relative to the first detector 210 along the Z-axis. The detection plates 215a and 215b detect a collision object on the object 100 as the second detector 220 moves relative to the first detector 210 along at least one of the X-axis and the Y-axis. The push switches 213 and the detection plates 215a and 215b forms a series connection circuit. When the second detector 220 does not move in any of the X-axis, the Y-axis, and the Z-axis, the contact detection unit 200 outputs a signal indicating that the series connection circuit is in an electrically conductive state.

According to Aspect 7, the liquid discharge apparatus 1000 can also detect the attachment state of the first detector 210 and the second detector 220 to the carriage 70.

Aspect 8

According to Aspect 8, in any one of Aspects 1 to 7, the contact detection unit 200 has the detection face 220a (an example of a detection face) that contacts the object 100 to detect a position of the object 100 relative to the carriage 70. The detection face 220a is larger in area than a liquid discharge face 302a (an example of a liquid discharge face) of the nozzles 302.

According to Aspect 8, a wide range can be detected at a time, and the position detection can be completed in a short time for the flat object 100.

Aspect 9

According to Aspect 9, in any one of Aspects 1 to 7, the contact detection unit 200 has the detection face 220a that contacts the object 100 to detect a position of the object 100 relative to the carriage 70. The detection face 220a is equivalent in area to a liquid discharge face 302a of the nozzles 302.

According to Aspect 9, the position of the object 100 can be accurately detected at an interval corresponding to the width of the head 300 used for actual ink discharge.

Aspect 10

According to Aspect 10, in any one of Aspects 1 to 7, the contact detection unit 200 has the detection face 220a that contacts the object 100 to detect a position of the object 100 relative to the carriage 70. The detection face 220a is smaller in area than a liquid discharge face 302a of the nozzles 302.

According to Aspect 10, the position of the object 100 can be finely detected, thereby preventing a collision object on the object 100 from being overlooked.

Aspect 11

According to Aspect 11, in any one of Aspects 1 to 10, the string-shaped component 230 (an example of a fall prevention component) that prevents the second detector 220 from falling from the first detector 210 is provided between the first detector 210 and the second detector 220.

According to Aspect 11, even when the second detector 220 is detached from the first detector 210, the string-shaped component 230 can prevent the second detector 220 from falling off and from being damaged or lost.

As described above, according to the present disclosure, the liquid discharge apparatus can be provided that prevents the liquid discharge unit from being damaged while moving the liquid discharge unit relative to the object.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. A liquid discharge apparatus comprising:
   a liquid discharger having a liquid discharge port from which a liquid is discharged toward an object, the liquid discharger being movable along at least one of a first axis and a second axis intersecting the first axis and movable along a third axis intersecting the first axis and the second axis, the third axis being parallel to a direction in which the liquid is discharged from the liquid discharge port toward the object; and
   a contact detection unit including a first detector to detect a position of the object and a second detector, which is different from the first detector, to detect a collision object, the contact detection unit being detachably attached to the liquid discharger,
   wherein the contact detection unit includes a detection face to contact the object to detect a position of the object relative to the liquid discharger, the detection face being equivalent in area to a liquid discharge face of the liquid discharge port.

2. The liquid discharge apparatus according to claim 1, wherein:
   the first detector is detachably attached to the liquid discharger,
   the second detector is detachably attached to the first detector.

3. The liquid discharge apparatus according to claim 2, wherein:
   the second detector is movable parallel to a movement direction of the liquid discharger relative to the first detector.

4. The liquid discharge apparatus according to claim 2, wherein:
   the first detector and the second detector are attached to each other by a magnetic force.

5. The liquid discharge apparatus according to claim 2, wherein:
   the second detector moves relative to the first detector along the third axis,
   the second detector moves relative to the first detector along at least one of the first axis and the second axis,
   the first detector and the second detector form a series connection circuit, and
   the contact detection unit outputs a signal indicating that the series connection circuit is in an electrically conductive state, when the second detector does not move along any of the first axis, the second axis, and the third axis.

6. The liquid discharge apparatus according to claim 2, further comprising:
   a fall prevention structure between the first detector and the second detector, the fall prevention structure to prevent the second detector from falling from the first detector.

7. The liquid discharge apparatus according to claim 2, wherein:
   the second detector moves relative to the first detector along the third axis,
   the second detector moves relative to the first detector along at least one of the first axis and the second axis.

8. The liquid discharge apparatus according to claim 1, wherein:
   the second detector moves relative to the first detector along the third axis,
   the second detector moves relative to the first detector along at least one of the first axis and the second axis.

9. A liquid discharge apparatus, comprising:
   a liquid discharger having a liquid discharge port from which a liquid is discharged toward an object, the liquid discharger being movable along at least one of a first axis and a second axis intersecting the first axis and movable along a third axis intersecting the first axis and the second axis, the third axis being parallel to a direction in which the liquid is discharged from the liquid discharge port toward the object; and
   a contact detection unit to detect contact of the liquid discharger with the object, the contact detection unit being detachably attached to the liquid discharger,
   wherein the contact detection unit includes:
      a first component to be detachably attached to the liquid discharger; and
      a second component to be detachably attached to the first component,
   wherein the contact detection unit is to perform at least one of a position detection and a collision object detection in response to movement of the first component and the second component, and
   wherein the first component and the second component are attached to each other by a magnetic force.

10. A liquid discharge apparatus, comprising:

a liquid discharger having a liquid discharge port from which a liquid is discharged toward an object, the liquid discharger being movable along at least one of a first axis and a second axis intersecting the first axis and movable along a third axis intersecting the first axis and the second axis, the third axis being parallel to a direction in which the liquid is discharged from the liquid discharge port toward the object; and a contact detection unit to detect contact of the liquid discharger with the object, the contact detection unit being detachably attached to the liquid discharger, wherein the contact detection unit includes:
- a first component to be detachably attached to the liquid discharger; and
- a second component to be detachably attached to the first component, wherein the contact detection unit is to perform at least one of a position detection and a collision object detection in response to movement of the first component and the second component, wherein the contact detection unit includes:
- a position detector to detect a position of the object relative to the liquid discharger as the second component moves relative to the first component along the third axis; and
- a collision object detector to detect a collision object on the object to collide with the liquid discharger as the second component moves relative to the first component along at least one of the first axis and the second axis, wherein the position detector and the collision object detector are to form a series connection circuit, and wherein the contact detection unit is to output a signal indicating that the series connection circuit is in an electrically conductive state, when the second component does not move along any of the first axis, the second axis, and the third axis.

* * * * *